(12) United States Patent
Ishii et al.

(10) Patent No.: US 7,677,976 B2
(45) Date of Patent: Mar. 16, 2010

(54) VIDEO GAME PROCESSING APPARATUS, A METHOD AND A COMPUTER PROGRAM PRODUCT FOR PROCESSING A VIDEO GAME

(75) Inventors: Koichi Ishii, Tokyo (JP); Satoshi Kitade, Tokyo (JP); Yuuichi Tsuchiya, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 350 days.

(21) Appl. No.: 11/856,984

(22) Filed: Sep. 18, 2007

(65) Prior Publication Data

US 2008/0102950 A1 May 1, 2008

(30) Foreign Application Priority Data

Sep. 21, 2006 (JP) ............................. 2006-256524

(51) Int. Cl.
*A63F 13/00* (2006.01)
(52) U.S. Cl. .............................. 463/31; 463/32; 463/52; 273/317.1; 345/419; 345/636; 345/683
(58) Field of Classification Search ................. 463/1–5, 463/7–9, 30–34, 36–39, 40–43, 49–57; 273/108.1, 273/127 R, 148 R, 148 B, 309, 317.1, 340, 273/348, 361–367; 348/14.15, 39, 42, 47–52, 348/121, 136–137, 211.14, 576, 588–589, 348/719, 721, E13.004, E13.064–E13.067; 345/1.1–1.3, 2.1–2.3, 3.1–3.4, 24, 419, 467–469, 345/539, 543–544, 625, 636, 638, 653–656, 345/664–666, 682–683, 686, 949–950, FOR. 139, 345/FOR. 153; 434/38, 43–44, 69, 118, 434/256–257; 375/240.15–240.16, 240.25
See application file for complete search history.

(56) References Cited

U.S. PATENT DOCUMENTS 6,210,273 B1 * 4/2001 Matsuno ........................ 463/8

(Continued)

FOREIGN PATENT DOCUMENTS

EP 1153636 11/2001

(Continued)

OTHER PUBLICATIONS

English Language Abstract of JP 3442184.

(Continued)

*Primary Examiner*—Peter DungBa Vo
*Assistant Examiner*—Arthur O. Hall
(74) *Attorney, Agent, or Firm*—Greenblum & Bernstein PLC

(57) ABSTRACT

When a player character applies a damage to an attack target character on the basis of an attack action of the player character, it is determined whether the attack is a direct attack or a specific kind of attack different from the direct attack and defined in advance. A panic reaction term of a panic reaction is determined in the case where it is determined that the attack is the specific kind of attack. In the panic reaction, the attack target character becomes a state where the attack target character cannot attack the player character and defend oneself from an attack from the player character. The panic reaction is executed until the panic reaction term elapses. A privilege is applied to the player character in the case where it is determined that the attack target character suffers the direct attack during execution of the panic reaction.

10 Claims, 8 Drawing Sheets

U.S. PATENT DOCUMENTS

| | | | | |
|---|---|---|---|---|
| 6,283,861 | B1* | 9/2001 | Kawai et al. | 463/43 |
| 6,375,571 | B1* | 4/2002 | Ohnuma et al. | 463/37 |
| 6,614,435 | B1* | 9/2003 | Tsujimoto | 345/473 |
| 6,807,521 | B1* | 10/2004 | Kurosawa et al. | 703/22 |
| 6,935,954 | B2* | 8/2005 | Sterchi et al. | 463/31 |
| 2002/0142848 | A1* | 10/2002 | Tsuchida et al. | 463/43 |
| 2004/0038739 | A1* | 2/2004 | Wanat | 463/36 |
| 2005/0221879 | A1* | 10/2005 | Tsuchiya | 463/8 |

FOREIGN PATENT DOCUMENTS

| | | | |
|---|---|---|---|
| JP | 3442184 | | 9/1996 |
| JP | 08229239 A | * | 9/1996 |
| JP | 2002 166045 | | 6/2002 |
| JP | 2002-166045 | | 6/2002 |
| JP | 2003 117230 | | 4/2003 |
| JP | 2003 144750 | | 5/2003 |

OTHER PUBLICATIONS

English Language Abstract of JP 2002-166045.

U.S. Appl. No. 11/678,890, filed Feb. 26, 2007, and entitled "Video Game Processing Apparatus, a Method and a Computer Program Product for Processing a Video Game".

"Zelda no Densetsu Koryaku Seiten Series No. 2 "Zelda no Densetsu—Majora no Kamen" Koryaku Seiten," Media Factory Inc., Japan, Jun. 13, 2000, first edition, p. 236, together with an English language partial translation thereof.

"3DO Kanpeki Koryaku Series 1 Super Street Fighter II X Hissho Koryakuho," Futabasha, Japan, Jan. 31, 1995, first edition, p. 9, together with an English language partial translation thereof.

"Ore No Shikabane Wo Koeteyuke Koshiki Shinansho—Sono Chi Tayasanu Tameni," ASCII Inc., Japan, Mar. 7, 2000, sixth edition, p. 32, together with an English language partial translation thereof.

"Biohazard 3 Last Escape Official Guidebook Kanzen Seihuku Hen," Capcom Co., Ltd., Japan, Nov. 13, 1999, first edition, p. 56, together with an English language partial translation thereof.

"Dino Crisis Prologue to Escape," Media Factory Inc., Japan, Jul. 1, 1999, first edition, p. 23, together with an English language partial translation thereof.

"Final Fantasy VIII Ultimania," DigiCube Co., Ltd., Japan, Feb. 18, 2003, 26th edition, pp. 59, 62, 63, 192 and 193, together with an English language partial translation thereof.

"Konami Official Guide Perfect Series Monster Guardians Perfect Guide," Konami Corporation, Japan, Jun. 11, 2001, first edition, p. 31, together with an English language partial translation thereof.

"Zill O'll infinite Complete Guide First Part," Koei Co., Ltd., Japan, Aug. 19, 2005, third edition, pp. 10 and 11, together with an English language partial translation thereof.

"Final Fantasy IX Ultimania," Square Enix Co. Ltd., Japan, Jul. 20, 2005, sixth edition, p. 158, together with an English language partial translation thereof.

"Seiken Densetsu: Legend of Mana Ultimania," DigiCube Co., Ltd., Japan, Sep. 30, 1999, first edition, pp. 97 and 103.

English language Abstract of JP 2002-166045.

English language Abstract of JP 2003-117230.

English language Abstract of JP 2003-144750.

* cited by examiner

FIG. 3

| SPECIFIC KIND OF ATTACK | | ABNORMAL STATE COUNTER (PANIC) | ABNORMAL STATE COUNTER | START TIMING FOR ABNORMAL STATE REACTION | START TIMING FOR PANIC REACTION |
|---|---|---|---|---|---|
| SPECIAL ATTACK | PETRIFACTION | ADDITION | ADDITION (PETRIFACTION) | IMMEDIATELY | TIME WHEN ABNORMAL STATE COUNTER (PANIC) VALUE > 0 AT ABNORMAL STATE COUNTER VALUE = 0 |
| | FREEZING | ADDITION | ADDITION (FREEZING) | IMMEDIATELY | TIME WHEN ABNORMAL STATE COUNTER (PANIC) VALUE > 0 AT ABNORMAL STATE COUNTER VALUE = 0 |
| | PARALYSIS | ADDITION | ADDITION (PARALYSIS) | IMMEDIATELY | TIME WHEN ABNORMAL STATE COUNTER (PANIC) VALUE > 0 AT ABNORMAL STATE COUNTER VALUE = 0 |
| | FAINTING | ADDITION | ADDITION (FAINTING) | IMMEDIATELY | TIME WHEN ABNORMAL STATE COUNTER (PANIC) VALUE > 0 AT ABNORMAL STATE COUNTER VALUE = 0 |
| | FLAME | ADDITION | ADDITION (FLAME) | IMMEDIATELY | TIME WHEN ABNORMAL STATE COUNTER (PANIC) VALUE > 0 AT ABNORMAL STATE COUNTER VALUE = 0 |
| | DARKNESS | ADDITION | ADDITION (DARKNESS) | IMMEDIATELY | TIME WHEN ABNORMAL STATE COUNTER (PANIC) VALUE > 0 AT ABNORMAL STATE COUNTER VALUE = 0 |
| | CONFUSION | ADDITION | ADDITION (CONFUSION) | IMMEDIATELY | TIME WHEN ABNORMAL STATE COUNTER (PANIC) VALUE > 0 AT ABNORMAL STATE COUNTER VALUE = 0 |
| | POISON | ADDITION | ADDITION (POISON) | IMMEDIATELY | TIME WHEN ABNORMAL STATE COUNTER (PANIC) VALUE > 0 AT ABNORMAL STATE COUNTER VALUE = 0 |
| INDIRECT ATTACK | | ADDITION | ALL CLEARED | | IMMEDIATELY |

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2006-256524, filed on Sep. 21, 2006, the disclosure of which is expressly incorporated herein by reference in its entirety.

BACKGROUND OF THE INVENTION

1. Field of the Invention

The present invention relates to a technique for controlling progress of a video game by displaying a player character on an image display screen of an image display apparatus, and by controlling an action of the characters displayed on the image display screen in response to operation(s) by a player.

2. Description of the Related Art

Heretofore, various kinds of so-called role playing games (RPG; that is, a game in which a player plays a role of a character in a world of the game to accomplish a predetermined object while enjoying a process that the character grows through various experiences) have been provided.

In such a RPG, generally, a player character acting in response to operations by the player wins a battle against an enemy character thwarting accomplishment of a predetermined object in the RPG, by which various benefits such as an experiential value are supplied to the player character.

In a video game such as a RPG, an attack against an enemy character in a battle is generally executed by means of a direct attack in which a weapon such as a sword part of magic is used or an indirect attack in which an object item unrelated to the player character and the enemy character is used.

In such an attack, heretofore, there is proposed a system in which it is determined whether or not an attack against an enemy character can be executed in view of movement speed of the player character and/or a distance between the player character and the enemy character.

Further, a video game in which an operation of a player is reflected in detail, a damage by an attack to an enemy character is directed and this makes reality or realism to be heightened to improve interest of the player in playing the video game has been proposed (for example, see Japanese Patent No. 3,442,184).

However, the attack against the enemy character in the conventional video game is often intended to merely apply a damage to an enemy character by means of an attack and to get the enemy character into a battle impossible state. For this reason, there has been a problem that it is hard to include a strategic factor into the attack, whereby it is hard to heighten interest of the player in playing the video game.

SUMMARY OF THE INVENTION

It is one object of the present invention to solve the problem described above and to provide a video game processing apparatus, a method and a computer program product for processing a video game capable of increasing variation of an attack by allowing a strategic attack during a battle in the video game, whereby it is possible to improve interest of a player in playing the video game.

In order to achieve the above object, an aspect of the present invention is directed to a video game processing apparatus. The video game processing apparatus (for example, a video game apparatus main body 10, a video game apparatus 100) controls progress of the video game by controlling an action of the player character to be displayed on the image display screen in accordance with operations by a player. The video game processing apparatus of the present invention includes an attack specification receiver that receives specification of an attack for the player character by means of an attack specification operation of the player.

The video game processing apparatus also includes an action determiner that, when the player character applies a damage to an attack target character on the basis of an attack action of the player character in accordance with the attack specification received by the attack specifying receiver, determines whether the attack suffered by the attack target character is a direct attack or a specific kind of attack, in the direct attack the attack target character suffering a damage directly from the player character, the specific kind of attack being different from the direct attack and defined in advance.

The video game processing apparatus also includes a reaction term determiner that determines a panic reaction term of a panic reaction in the case where the attack determiner determines that the attack is the specific kind of attack, the panic reaction being a specific kind attack suffered reaction indicating a reaction of the attack target character that suffers the specific kind of attack, in the panic reaction the attack target character becoming a state where the attack target character cannot attack the player character and defend oneself from an attack from the player character.

The video game processing apparatus also includes a reaction executor that executes the panic reaction for the attack target character that suffers the specific kind of attack until the panic reaction term determined by the reaction term determiner elapses.

The video game processing apparatus also includes a privilege applier that applies a privilege to the player character in the case where the attack determiner determines that the attack target character suffers the direct attack during execution of the panic reaction by the reaction executor.

Since the video game processing apparatus may have a configuration as described above, it is possible to increase variation of an attack by allowing a strategic attack (for example, an attack to obtain a privilege) during a battle in the video game, and this makes it possible to improve interest of a player in playing the video game.

It is preferable that the reaction executor causes the image display apparatus to display a status about the degree of the panic reaction in the vicinity of a display position of the attack target character on the image display screen while the panic reaction is executed for the attack target character. Since the video game processing apparatus may have a configuration as described above, the player is allowed to easily view the degree of the panic reaction of the attack target character, and this makes it possible to increase variation of the attack by causing the player to consider a strategic attack.

It is preferable that the reaction term determiner determines a new panic reaction term by extending a remaining term of the previous panic reaction term in the case where the attack determiner determines that an additional attack that the attack target character suffers during execution of the panic reaction is the specific kind of attack. Since the video game processing apparatus may have a configuration as described above, it is possible to arbitrarily extend the panic reaction term for the attack target character due to an attack, and this makes it possible to increase variation of the attack by causing the player to consider a strategic attack.

It is preferable that the specific kind of attack includes an indirect attack in which the player character applied an attack to the attack target character through an object item. Since the video game processing apparatus may have a configuration as described above, it is possible to execute the panic reaction for the attack target character by executing an indirect attack using an object item, and this makes it possible to increase variation of the attack by causing the player to consider a strategic attack.

It is preferable that the video game processing apparatus further includes an abnormal state reaction term determiner that determines an abnormal state reaction term of an abnormal state reaction in the case where the attack determiner determines that the attack is a special attack, the abnormal state reaction being a specific kind attack suffered reaction indicating a reaction of the attack target character that suffers the special attack in which the attack target character becomes an abnormal state in accordance with the kind of the special attack, the specific attack in which the player character applies an attack inducing an abnormal state such as a flame, freezing, a paralysis, darkness, confusion, fainting, petrifaction or poison to the attack target character being included in the specific kind of attack. In this case, the reaction executor executes the abnormal state reaction for the attack target character, which suffers the special attack, until the abnormal state reaction term determined by the abnormal reaction term determiner elapses without executing the panic reaction, and executes the panic reaction for the attack target character until the panic reaction term elapses in the case where the panic reaction term does not elapse when the abnormal state reaction term has elapsed. Since the video game processing apparatus may have a configuration as described above, it is possible to execute the abnormal state reaction for the attack target character in priority to the panic reaction by executing the special attack inducing an abnormal state, and this makes it possible to increase variation of the attack by causing the player to consider a strategic attack.

It is preferable that, in the case where the new panic reaction term determined by the reaction term determiner exceeds a predetermined threshold value during the execution of the panic reaction, the reaction executor terminates the execution of the panic reaction for the attack target character and causes the image display apparatus to display a status indicating that the new panic reaction term exceeds the predetermined threshold value in the vicinity of a display position of the attack target character on the image display screen, and executes a first specific reaction, in which the attack target character becomes a state where the attack target player can attack the player character and defend oneself from the player character, until the new panic reaction term elapses. In this case, the privilege applier may apply a privilege according to the display status of the attack target character to the player character in the case where the attack target character suffers the direct attack from the player character to become a battle impossible state during execution of the first specific reaction. Since the video game processing apparatus may have a configuration as described above, the player character is also allowed to obtain a privilege during the execution of the first specific reaction different from the panic reaction, and this makes it possible to increase variation of the attack by causing the player to consider a strategic attack.

It is preferable that, in the case where the new panic reaction term determined by the reaction term determiner becomes a predetermined set value during the execution of the panic reaction, the reaction executor terminates the execution of the panic reaction for the attack target character and causes the image display apparatus to display a status by lottery on the basis of the predetermined set value in the vicinity of a display position of the attack target character on the image display screen, and executes a second specific reaction, in which the attack target character becomes a state where the attack target player can attack the player character and defend oneself from the player character, until the new panic reaction term elapses. In this case, the privilege applier may apply a privilege according to the display status of the attack target character to the player character on the basis of a predetermined condition during execution of the second specific reaction. Since the video game processing apparatus may have a configuration as described above, the player character is also allowed to obtain a privilege during the execution of the second specific reaction different from the panic reaction, and this makes it possible to increase variation of the attack by causing the player to consider a strategic attack.

It is preferable that the privilege applier applies a privilege to the player character in accordance with a remaining term of the panic reaction term in the case where the attack determiner determines that the attack target character suffers the direct attack from the player character during the execution of the panic reaction. Since the video game processing apparatus may have a configuration as described above, the player character is allowed to obtain a privilege by executing a direct attack against the attack target character during the execution of the panic reaction even when the panic reaction term does not elapse, and this makes it possible to increase variation of the attack by causing the player to consider a strategic attack.

It is preferable that, in the case where the attack target character suffers the direct attack from the player character to become a battle impossible state during the execution of the panic reaction, the privilege applier draws lots relating to application of the privilege with a lottery probability according to a remaining term of the panic reaction term, and applies the privilege to the player character on the basis of a draw result. Since the video game processing apparatus may have a configuration as described above, the player character is allowed to obtain a privilege by causing the attack target character to become a battle impossible state by means of a direct attack during the execution of the panic reaction, and this makes it possible to increase variation of the attack by causing the player to consider a strategic attack.

It is preferable that the privilege is an item utilized to have an influence on a status or ability of at least one of the player character and the attack target character. Since the video game processing apparatus may have a configuration as described above, it is possible to increase variation of the attack tended to obtain an item using the panic reaction and the like.

Further, according to another aspect of the present invention, the present invention is directed to a method of processing a video game by causing an image display apparatus to display a player character of a video game on an image screen of the image display apparatus. In this case, the method controls progress of the video game by controlling an action of the player character to be displayed on the image screen in accordance with an operation by a player. The method of the present invention includes receiving specification of an attack for the player character by means of an attack specification operation of the player.

The method also includes, when the player character applies a damage to an attack target character on the basis of an attack action of the player character in accordance with the attack specification received in the receiving specification of an attack, determining whether the attack suffered by the attack target character is a direct attack or a specific kind of attack, in the direct attack the attack target character suffering a damage directly from the player character, the specific kind of attack being different from the direct attack and defined in advance.

The method also includes determining a panic reaction term of a panic reaction in the case where it is determined that the attack is the specific kind of attack in the determining whether the attack, the panic reaction being a specific kind attack suffered reaction indicating a reaction of the attack target character that suffers the specific kind of attack, in the panic reaction the attack target character becoming a state where the attack target character cannot attack the player character and defend oneself from an attack from the player character.

The method also includes executing the panic reaction for the attack target character that suffers the specific kind of attack until the panic reaction term determined in the determining a panic reaction term elapses.

The method also includes applying a privilege to the player character in the case where it is determined that the attack target character suffers the direct attack during execution of the panic reaction in the executing the panic reaction.

Moreover, according to still another aspect of the present invention, the present invention is directed to a computer program product for processing a video game. In this case, progress of the video game is controlled by causing an image display apparatus to display a player character of the video game on an image screen of the image display apparatus, and controlling an action of the player character to be displayed on the image screen in accordance with an operation by a player. The computer program product of the present invention causes a computer (for example, the video game apparatus 100, including the video game apparatus main body 10) to execute steps including receiving specification of an attack for the player character by means of an attack specification operation of the player.

The steps also include, when the player character applies a damage to an attack target character on the basis of an attack action of the player character in accordance with the attack specification received in the receiving specification of an attack, determining whether the attack suffered by the attack target character is a direct attack or a specific kind of attack, in the direct attack the attack target character suffering a damage directly from the player character, the specific kind of attack being different from the direct attack and defined in advance.

The steps also include determining a panic reaction term of a panic reaction in the case where it is determined that the attack is the specific kind of attack in the determining whether the attack, the panic reaction being a specific kind attack suffered reaction indicating a reaction of the attack target character that suffers the specific kind of attack, in the panic reaction the attack target character becoming a state where the attack target character cannot attack the player character and defend oneself from an attack from the player character.

The steps also include executing the panic reaction for the attack target character that suffers the specific kind of attack until the panic reaction term determined in the determining a panic reaction term elapses.

The steps also include applying a privilege to the player character in the case where it is determined that the attack target character suffers the direct attack during execution of the panic reaction in the executing the panic reaction.

According to the present invention, it is possible to increase variation of an attack by allowing a strategic attack during a battle in the video game, and this makes it possible to improve interest of a player in playing the video game.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is an explanatory drawing that shows an example of relationship between a specific kind of attack, an abnormal state counter by the attack, and start timing for each of various reactions.

DETAILED DESCRIPTION OF THE INVENTION

Preferred embodiments of a video game processing apparatus, a method and a computer program product for processing a video game according to the present invention will now be described in detail with reference to the appending drawings.

Figure 1:
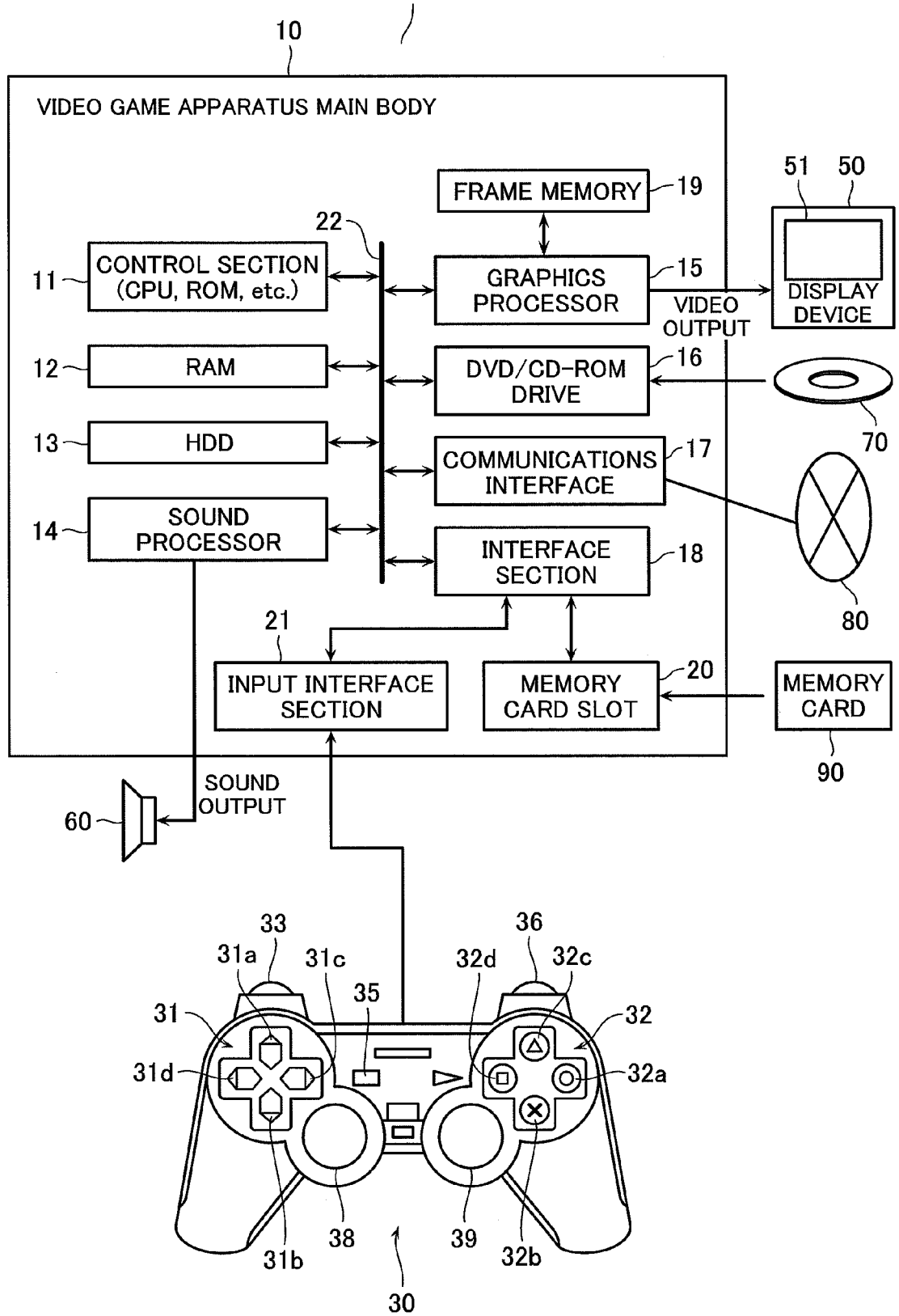
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the present invention.

As shown in FIG. 1, a video game apparatus 100 of the present embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micro-mirror device, a holographic display device, or any combination thereof. The display device 50 is provided with an image display screen 51. However, those skilled in the art will readily recognize that any device capable of generating or reproducing an image may be used without departing from the scope or spirit of the present invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input interface section 21.

Each of the control section 11, the RAM (Random Access Memory) 12, the HDD (Hard Disk Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like. The control section 11 executes control processes of the whole video game apparatus 100 in accordance with control programs stored in the HDD 13 and/or a storage medium 70. The control section 11 includes an internal timer used to generate a timer interruption, for example. The RAM 12 is mainly used as a work area for the control section 11. The HDD 13 is a storage area for storing the control programs and various data in the video game apparatus body 10.

The sound processor 14 has a function of an audio input/output interface for carrying out D/A conversion and A/D conversion of a sound signal (or audio signal). The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that executes a process according to the various control programs. Further, the sound processor 14 is also connected to a sound input device (not shown in the drawings) constituted from a microphone, for example. A sound signal from the sound input device is inputted into the sound processor 14 in accordance with a sound input command from the control section 11. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the present invention. The graphics processor 15 develops an image on the frame memory 19 in accordance with a drawing or graphics command from the control section 11, and outputs video signals for displaying the image on the image display screen 51 to the display device 50. A switching time for images to be displayed according to the video signals is set to $\frac{1}{30}$ seconds per frame (for NTSC type displays), for example. However, the switching time may be any other frame rate (for example, $\frac{1}{25}$ second per frame (for PAL type displays)) as those skilled in the art will appreciate without departing from the spirit or scope of the present invention.

A storage medium 70 such as a DVD-ROM medium or a CD-ROM medium, or equivalent, in which control programs for a video game are stored is mounted in the DVD/CD-ROM drive 16. The DVD/CD-ROM drive 16 executes a process for reading out various data such as control programs from the storage medium 70. The storage medium 70 may be, other than the DVD-ROM or the CD-ROM described above, various types of DVD (such as DVD-RAM, DVD-R, DVD-RW, DVD+R, DVD+RW or DVD+RDL) or various types of CD (such as CD-R or CD-RW). In this case, in place of or in addition to the DVD/CD-ROM drive 16, the video game apparatus main body 10 may be provided with a drive for executing processes to read out and/or write various kinds of data from and/or into the storage medium 70.

The communications interface 17 is connected to a communication network 80 such as the Internet, a local area network (LAN), a wide area network (WAN), or the like, in a wireless or wired manner. The video game apparatus main body 10 carries out communication with, for example, another computer via the communication network 80 using a communication function of the communications interface 17.

Each of the input interface section 21 and the memory card slot 20 is connected to the interface section 18. The interface section 18 causes instruction data from the input interface section 21 to be stored in the RAM 12 on the basis of operation(s) of a controller device such as a keypad 30 by a player of the video game apparatus 100. In response to the instruction data stored in the RAM 12, the control section 11 executes various arithmetic processing.

The video game apparatus main body 10 is connected to the controller device such as the keypad 30 as an operation input section (controller) via the input interface section 21. However, other types of controllers may be used without departing from the scope or spirit of the present invention.

As shown in FIG. 1, for example, a cross key 31, a group of buttons 32, a left joystick 38 and a right joystick 39 are arranged on the upper surface of the keypad 30. The cross key 31 includes an upper key 31a, a lower key 31b, a right key 31c and a left key 31d. The group of buttons 32 includes a circle button 32a, an X key 32b, a triangle key 32c and a square key 32d. Further, a select button 35 and a start button 37 are arranged at a connecting portion between a base on which the cross key 31 is arranged and a base on which the group of buttons 32 are arranged. In addition, multiple buttons such as an R1 button 36 and an L1 button 33 are arranged at the side surface of the keypad 30.

The keypad 30 constituted in this manner is provided with multiple switches respectively connected to the cross key 31, the circle button 32a, the X button 32b, the triangle button 32c, the square button 32d, the select button 35, the start button 37, the R1 button 36 and the L1 button 33. When pressing force is applied to any button, the corresponding switch is turned on. A detected signal in accordance with on/off of the switch is generated in the keypad 30, and detected signals are generated, respectively, corresponding to inclined directions of the left joystick 38 and the right joystick 39 in the keypad 30.

The two types of detected signals generated in the keypad 30 are outputted to the control section 11 via the input interface section 21 (through wired or wireless connection), by which detected information indicating that any button on the keypad 30 is pressed and detected information indicating the state of each of the left joystick 38 and the right joystick 39 are generated. In this way, operation instruction(s) by a user (player) using the keypad 30, for example, is supplied to the video game apparatus main body 10 (that is, the control section 11).

Further, the interface section 18 executes, according to the command(s) from the control section 11, a process to store data indicative of the progress of the video game stored in the RAM 12 into the memory card 90 installed in the memory card slot 20. The interface section 18 also executes processes to read out data on the video game stored in the memory card 90 at the time of suspending the video game and to transfer such data to the RAM 12, and the like.

Various data, such as control program data for performing the video game with the video game apparatus 100, are stored in the storage medium 70, for example. The various data, such as the control program data stored in the storage medium 70, are read out by the DVD/CD-ROM drive 16 in which the storage medium 70 is installed. The data thus read out are loaded onto the RAM 12. The control section 11 executes, in accordance with the control program loaded on the RAM 12, various processes such as a process to output the drawing or graphics command to the graphics processor 15, and a process to output the sound outputting command to the sound processor 14. In this regard, the interim data generated in response to the progress of the video game (for example, data indicative of scoring of the video game, the state of a player character and the like) are stored in the RAM 12 used as a work memory while the control section 11 executes processing.

It is assumed that a three-dimensional video game according to an aspect of the present embodiment is a video game wherein multiple characters, including a player character (PC: a character that moves in accordance with the operation of the keypad 30 by the player), move on a field provided in a virtual three-dimensional space displayed on the image display screen 51, by which the video game proceeds. In this regard, it is assumed that the virtual three-dimensional space in which the field is formed is indicated by coordinates of the world coordinate system. Further, the field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation of the operation of the video game apparatus 100, it is assumed that only a single player character, multiple non-player characters (which are moved in accordance with control processes of the video game apparatus 100 (more specifically, control processes of the control section 11), and hereinafter, referred to simply as "NPC"), and an object item (which is an item to which a neutral roll against the player character PC and the non-player characters NPC is applied, and hereinafter, referred to simply as "OI") exist as objects that are movable in the virtual three-dimensional space. However, the explanations for any process other than the processes relating to the present invention are omitted, in particular. In this regard, in the present embodiment, video game control for a RPG is executed, but those skilled in the art will recognize and appreciate that changes to the present invention can be made without departing from the scope or spirit of the present invention.

Figure 2:
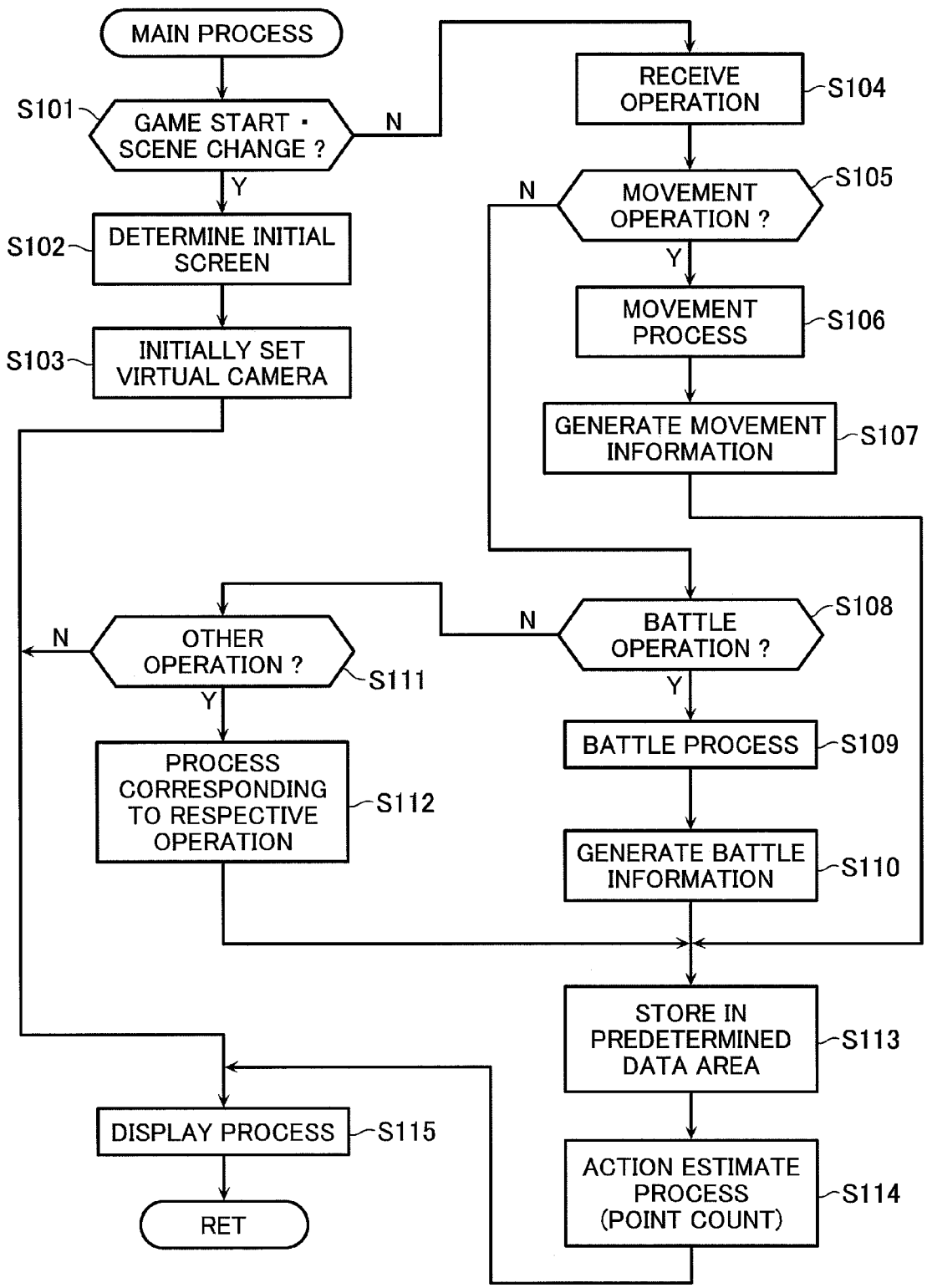
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game. The process is executed in accordance with a timer interruption at every 1/30 second. However, it is to be noted that timing of "at every 1/30 second" is only one example, as mentioned above. Instead, for example, the main process may be executed in accordance with a timer interruption at every single field period (every 1/60 second) or at every two frame periods (every 1/15 second), or any other appropriate field rate that may be recognized by those skilled in the art to be appropriate without departing from the scope or spirit of the present invention.

In the present embodiment, a video game (that is, a RPG game) proceeds in a common field (that is, a single field where a battle field and a movement field are not distinguished from each other) in which various actions (such as a battle action and/or a movement action), including the movement of the player character PC and a battle by the player character PC, are allowed. In the case where a predetermined object in the field is accomplished, one stage may be terminated and the processing may proceed to another stage executed in a next field. Further, in the present embodiment, a same time base is applied to the respective characters existing in such a field. Once an NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a video game is generated through an operation of the keypad 30, via manipulation of the controller 30 by the player or not in the case where the state is still before the video game start. Alternatively, once the video game has started or is in progress, the control section 11 determines whether a timing state is reached to change the scene (for example, change the field) or not in the case where the state is during execution of the video game (Step S101). The timing state to change the scene is, for example, the time at which a virtual three-dimensional space illustrating a new scene is displayed on the image display screen 51 in order to finish the scene that has been displayed on the image display screen 51 until that point (for example, a scene displayed by means of a virtual three-dimensional space, and a scene displayed by means of a directorial moving image) and to switch the displayed scene to the new scene.

In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102). In this case, various data, such as image data used for the video game and characters, are stored in the storage medium 70. At Step S102, an initial display position of the player character PC in an initial screen or a scene after a scene change (for example, a new stage in the RPG), a non-player character NPC or non-player characters NPCs to be displayed, an initial display position of each of the non-player characters NPCs to be displayed, an icon or icons to be displayed, an initial display position of each of the object icons OI to be displayed and the like are determined in accordance with the control program.

Subsequently, the control section 11 determines a viewpoint position of a virtual camera, a direction of a visual axis, and a size of a visual angle in accordance with the control program. The control section 11 then executes an initial setup for the virtual camera to execute a perspective transformation (Step S103). Then, the processing flow proceeds to Step S115.

On the other hand, in the case where it is determined that the video game is executed, and it is not time to change the scene ("No" at Step S101), the control section 11 receives instruction data in accordance with the operation of the keypad 30 by the player (Step S104). Namely, the control section 11 determines whether or not instruction data for executing movement of the player character PC or the like are inputted from the keypad 30 via the input interface section 21. In the case where effective instruction data (that is, it means that such effective instruction data are instruction data that is allowed to be received by the control section 11) are inputted, the control section 11 receives the effective instruction data.

In the case where the control In the case where it is determined that an instruction to start a video game is generated or that the timing state reaches a state to change the scene ("Yes" at Step S101), the control section 11 determines an initial screen (an initial screen shown at the time of a start of the video game, or an initial screen shown at the time of a change in the scene) in accordance with the control program (Step S102). In this case, various data, such as image data used for the video game and characters or icons, are stored in the storage medium 70. At Step S102, an initial display position of the player character PC in an initial screen or a scene after a scene change (for example, a new stage in the RPG), a non-player character NPC or non-player characters NPCs to be displayed, an initial display position of each of the non-player characters NPCs to be displayed, an icon or icons to be displayed, an initial display position of each of the icons to be displayed and the like are determined in accordance with the control program. section 11 receives instruction data for instructing an action of the player character PC relating to the movement of the player character PC (that is, movement instruction data: a movement instruction by a movement command or the cross key 31 (directional instruction key)) in accordance with the operation of the keypad 30 relating to the movement of the player character PC (movement operation) at Step S104 ("Yes" at Step S105), the control section 11 executes a movement process in accordance with the movement instruction data thus received (Step S106). In the movement process, the control section 11 causes the position of the player character PC to be moved in a virtual space (on the present field) in accordance with the received movement instruction data. In this regard, such a movement command may include a dash instruction command, for example. The dash instruction command is a command to move the player character PC quickly, and a command for supplying an instruction that the player character PC goes away (or runs away) from a battle area quickly if the player character is in a melee, for example.

Subsequently, the control section 11 generates movement information on the basis of the position information of the player character PC derived along with the movement process (Step S107). Namely, in accordance with the movement of the position of the player character PC by means of the movement process, the control section 11 updates necessary data among data on the viewpoint position of the virtual camera, data on the direction of a visual axis, data on the size of a visual angle, and the like. The control section 11 then changes the setting content of the virtual camera. The movement information includes various kinds of information on the movement such as the position of the player character PC after the movement, the viewpoint position of the virtual camera, the direction of the visual axis, and the size of the visual angle changed along with the movement of the player character PC as well as the information on the movement of the player character PC. Then, the processing flow proceeds to Step S113.

In the case where the control section 11 receives instruction data for instructing an action for the player character PC relating to a battle (that is, battle instruction data: a battle command) in accordance with the operation of the keypad 30 by the player for instructing the action of the player character PC relating to a battle (a battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character NPC to battle against) and the player character PC, and to determine how an object item OI is related to the battle.

Subsequently, the control section 11 generates battle information on the basis of the battle result and/or battle development determined by means of the battle process (Step S110). Namely, in accordance with the battle result and/or battle development by the battle process, the control section 11 updates and sets necessary information. The set information may include, for example, the name of the player character PC that battles an enemy character in the battle process, the name of the enemy character, battle development information, battle result information, a parameter (or parameters) that defines the ability (or abilities) of the player character PC, and the like. The battle information includes various kinds of information on the battle, such as the name of the player character PC that battles the enemy character, the name of the enemy character, battle development, battle result thereof, and a parameter that defines the ability of the player character PC. Then, the processing flow proceeds to Step S113.

In the case where the control section 11 receives instruction data for other instructions (that is, other instruction data: an other command) in accordance with the operation of the keypad 30 for executing other instruction (other operation) at Step S104 ("No" at Step S105, "No" at Step S108, and "Yes" at Step S111), the control section 11 executes a process (for example, a conversation between characters, a purchase action, a pick up action, movement of an object item OI and the like) in accordance with the other instruction data thus received (Step S112). The other information corresponding to the process result at Step S112 is then generated, and the processing flow proceeds to Step S113.

The control section 11 updates the current position of the player character PC by storing the movement information generated at Step S107 in a predetermined data area of the RAM 12 at Step S113. Further, the control section 11 memorizes and stores various action histories of the player character PC by storing the battle information generated at Step S110 and the other information generated after Step S112 in a predetermined data area of the RAM 12 at Step S113.

Subsequently, the control section 11 executes an action estimate process on the basis of the information indicating the action histories of the player character PC once stored in the RAM 12 (Step S114). More specifically, information required to be digitized is digitized using conversion tables prepared in advance. Further, with respect to information required to be weighted, a score is calculated by multiplying a predetermined coefficient and summing these multiplied numerical values. The calculated score is added to a previous score stored in a predetermined data area of the RAM 12, and the added score is again stored in the predetermined data area. In this way, the score is updated as estimate information.

Then, the control section 11 perspectively transforms the virtual three-dimensional space including the player character PC, the non-player characters NPCs and the object item OI to be displayed from the virtual camera onto the virtual screen in accordance with the setting contents of the virtual camera and the like. The control section 11 then executes a display process to generate a two-dimensional image to be displayed on the image display screen 51 (Step S115). When the display process is terminated, this main process is also terminated. Then, when a timer interruption is generated at the time of a start of a next frame period, a next main process is executed (that is, the main process is repeated). By repeatedly executing the main process, a character image is switched or shifted every frame period, and a moving image (animation) is resultantly displayed on the image display screen 51.

Now, the display process at Step S115 will be briefly described. At Step S115, the control section 11 first transforms at least the coordinates of the vertexes of respective polygons included within a range to be perspectively transformed on the virtual screen among the coordinates of the vertexes of polygons constituting the virtual three-dimensional space, in which the player character PC, the non-player characters NPCs and the object item OI are included, from the coordinates of the world coordinate system to the coordinates of the viewpoint coordinate system. Subsequently, the control section 11 transmits the coordinates of the vertexes of the polygons of the player character PC, the non-player characters NPCs and the object item OI in the viewpoint coordinate system to the graphics processor 15, thereby outputting a drawing or graphics command to the graphics processor 15.

When the drawing or graphics command is inputted to the graphics processor 15, the graphics processor 15 updates, on the basis of the coordinates of the viewpoint coordinate system, the content of the Z buffer so that data on the points that reside at the front side are retained with respect to each of points constituting respective surfaces. When the content of the Z buffer is updated, the graphics processor 15 develops image data on the points that reside at the front side on the frame memory 19. Moreover, the graphics processor 15 executes some processes such as a shading process and a texture mapping process with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals outputted from the graphics processor 15 on the image display screen 51. By switching images displayed on the image display screen 51 every single frame period, the player can see images including the state in which the player character PC, the non-player characters NPCs or the object item OI are moved on the field and perceive the images as moving images.

In the video game apparatus 100 of the present embodiment, with respect to the battle process at Steps S108 to S110 described above, a new game element, in which an enemy character (attack target character: which the player character PC described above is to attack) becomes a panic reaction state where the enemy character cannot attack the player character PC and defend oneself from the player character PC when the enemy character suffers a specific kind of attack, and a privilege is applied to the player character PC when the enemy character suffers a direct attack in this case, is realized.

In this regard, the "direct attack" referred to herein means an attack (for example, a damage by a tool) that the enemy character directly suffers from the player character PC. The "specific kind of attack" means an attack different from the direct attack and defined in advance, and includes an indirect attack and a special attack in which an attack inducing an abnormal state is applied to the enemy character, for example. Further, the "damage" referred to herein includes not only one by which a hit point HP of each character is reduced but also one by which a change in the state occurs (for example, inducing an abnormal state).

Here, in order to execute the panic reaction described above, parameters of various data such as an abnormal state counter, an abnormal state counter (panic), a panic range and a panic trigger flag are provided for the player character PC and each of the enemy characters in the present embodiment. The abnormal state counter is constituted from a variable value in the range of 0 to 999, for example. The abnormal state counter is provided for each of the enemy characters individually. In the case where a counter value of the abnormal state counter becomes larger than 0, it is meant that the corresponding enemy character is affected by an abnormal state indicated by the counter value among multiple kinds of abnormal states. The counter value is subtracted by one for every one frame, for example. In this regard, a priority level to process the abnormal state counter is set higher than that to process an abnormal state counter (panic) (will be described later).

The abnormal state counter (panic) is constituted from a panic upward value and a panic downward value each of which is a fixed value in the range of 0 to 255, for example. The abnormal state counter (panic) is to be added to attack data. The panic upward value indicates a counter (panic) value that is added when an enemy character suffers an attack. In the case where the counter (panic) value is one or more, the panic downward value is set to 0. Further, the panic downward value indicates a counter (panic) value that is subtracted when the enemy character suffers the attack. In the case where the counter (panic) value is one or more, the panic upward value is set to 0. In the case where the counter value of the abnormal state counter (panic) is larger than 0 and the counter value of the abnormal state counter described above is 0, it is represented that the enemy character becomes a panic reaction state. Each of the panic upward value and the panic downward value is set in response to each kind of attack in advance. Thus, different panic upward value and panic downward value are to be utilized for the suffered attack. In this case, the same panic upward value and panic downward value may be associated with multiple kinds of attacks.

In the case where an enemy character is in a panic reaction state, a panic level of the panic reaction is calculated on the basis of the counter value of the abnormal state counter (panic). A status different from every panic level is displayed in the vicinity of a display position of the enemy character on the image display screen 51. The panic level is set to any of level 0 (counter value: 0), level 1 (counter value: 1 to 50), level 2 (counter value: 51 to 100) and level 3 (counter value: 101 to 255). A panic reaction term of the enemy character and the status of parameters during the panic reaction are different from each other in accordance with the level.

In this case, the panic reaction term indicates a term while the enemy character becomes a panic reaction state. The panic reaction term may be determined on the basis of the type of the specific kind of attack or the like independently of the counter value of the abnormal state counter (panic), or may be determined on the basis of parameters predefined for every enemy character.

The panic range is provided for each of the enemy characters separately, for example, and indicates a range where each enemy character can respond to a panic trigger (will be described later). The panic trigger flag is constituted from a fixed value of either 0 or 1, for example, and is to be added to the attack data. The panic trigger flag indicates whether the attack is the panic trigger or not. The panic trigger means an attack by which the counter value of the abnormal state counter (panic) is increased when the attack comes into contact with the panic range of the enemy character.

Thus, in the case where the panic trigger flag is set to 1 when the panic trigger comes into contact with the panic range, the control section 11 determines an attack attitude of the attack, and determines whether or not attack resistance of the enemy character against the attack attitude is "weak" or "normal". In the case where it is determined that the attack resistance is "weak" or "normal", the control section 11 executes a process to increase the counter value of the abnormal state counter (panic). In this regard, each of various enemy characters is set so as to have any attack resistance of "weak", "normal", "invalid" and "absorption" for the attack attitude of the special attack such as "flame" or "freezing" (will be described later).

FIG. 3 is an explanatory drawing that shows an example of relationship between a specific kind of attack, the abnormal state counter by the attack, and start timing for each of various reactions. As shown in FIG. 3, the specific kind of attack includes a special attack (so-called magic attack system) and an indirect attack. Here, the "indirect attack" means an attack that the player character applies to the enemy character through the object item OI described above. For example, an attack in which the player character throws an object item OI toward the enemy character, an attack in which the player character causes the enemy character, which suffers the attack, to come into contact with an object item OI, and the like may be mentioned.

The special attack includes various kinds of attacks such as "petrifaction", "freezing", "paralysis", "fainting", "flame", "darkness", "confusion" and "poison", for example. In the case where the special attack of "petrifaction" is applied to the enemy character, a "petrifaction" counter value is added to the abnormal state counter and the counter value is added to the abnormal state counter (panic). Further, when the special attack of "freezing" is applied to the enemy character, a "freezing" counter value is added to the abnormal state counter and the counter value is added to the abnormal state counter (panic).

Otherwise, in the case where the special attack of "paralysis", "fainting", "flame", "darkness", "confusion" or "poison" is applied to the enemy character, a corresponding "paralysis" counter value, "flame" counter value, "darkness" counter value, "confusion" counter value or "poison" counter value is added to the abnormal state counter and the counter value is added to the abnormal state counter (panic).

On the other hand, in the case where an indirect attack is applied to the enemy character, all of the "petrifaction" counter value, the "freezing" counter value, the "paralysis" counter value, the "fainting" counter value, the "flame" counter value, the "darkness" counter value, the "confusion" counter value and the "poison" counter value are cleared, and the counter value is added to the abnormal state counter (panic). As shown in FIG. 3, in the case where the special attack is applied to the enemy character, start timing for an abnormal state reaction for starting the abnormal state reaction of the enemy character becomes "immediately", and start timing for the panic reaction for starting the panic reaction of the enemy character becomes "the time when the abnormal state counter (panic) value is more than 0 when the abnormal state counter value described above is 0". Moreover, in the case where the indirect attack is applied to the enemy character, all of the counter values of the abnormal state counter are cleared. Thus, a panic reaction is started immediately.

In this regard, the relationship between the specific kind of attack, the abnormal state counter and various kinds of reaction start timing shown in FIG. 3 is mentioned as an example. For example, other items such as the kind of enemy character, an attribute value of the enemy character, or a compatibility value may be related to the above relationship.

Next, the indirect attack will be described in detail.

Figure 4:
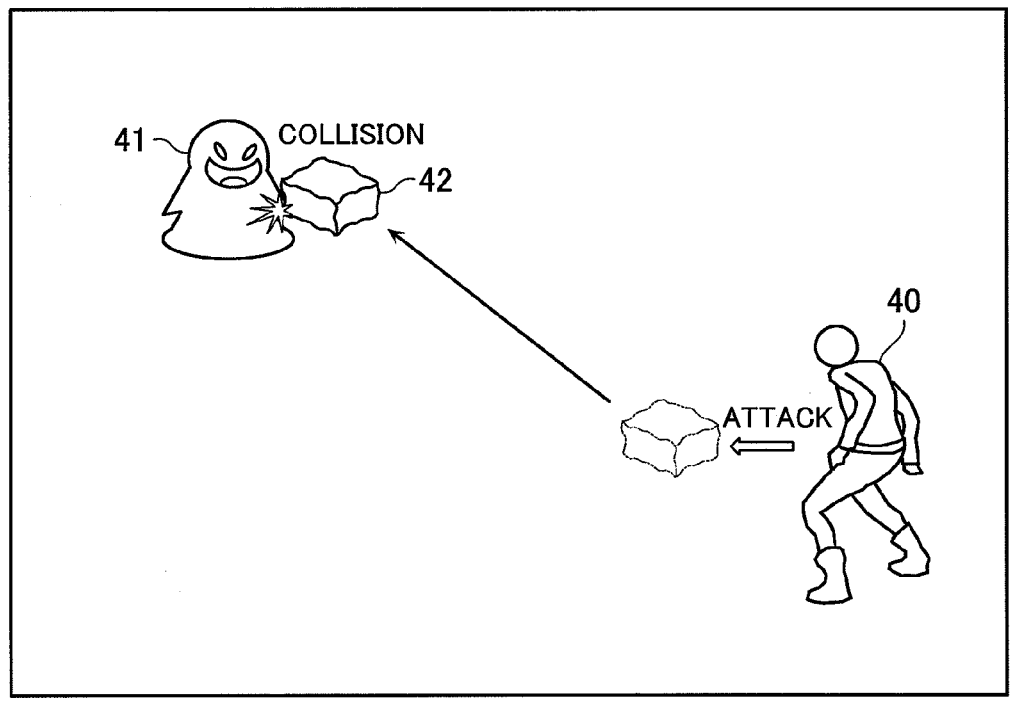
FIG. 4 is an explanatory drawing that shows an example of an indirect attack that a player character applies to an enemy character that is an attack target character.
Figure 5:
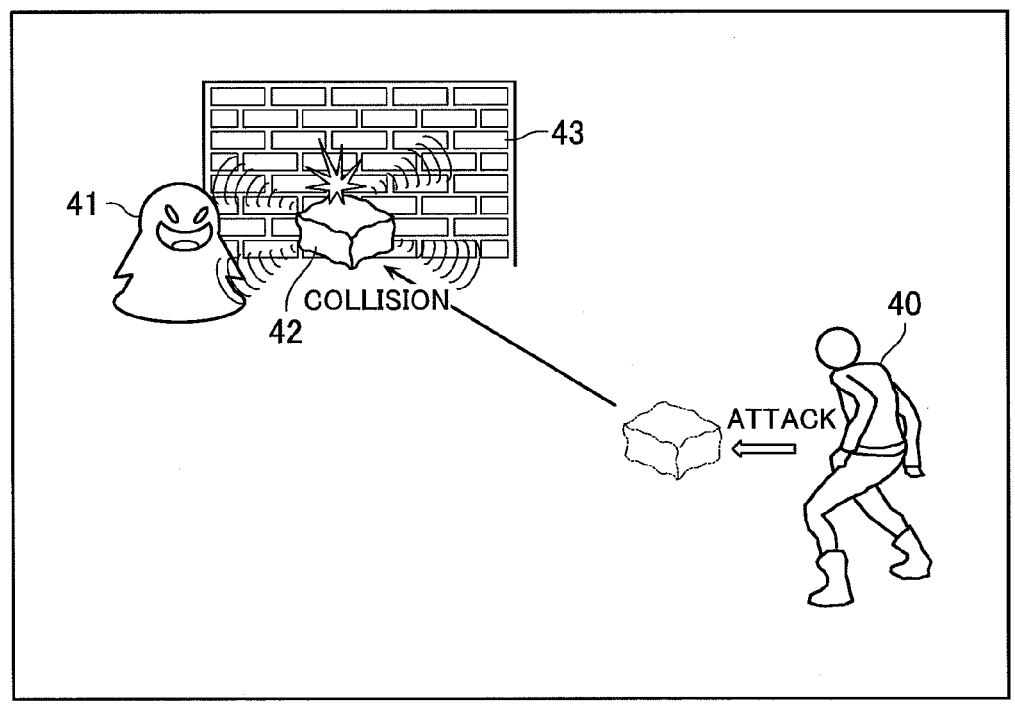
FIG. 5 is an explanatory drawing that shows an example of the indirect attack that the player character applies to the enemy character that is an attack target character.
Figure 6:
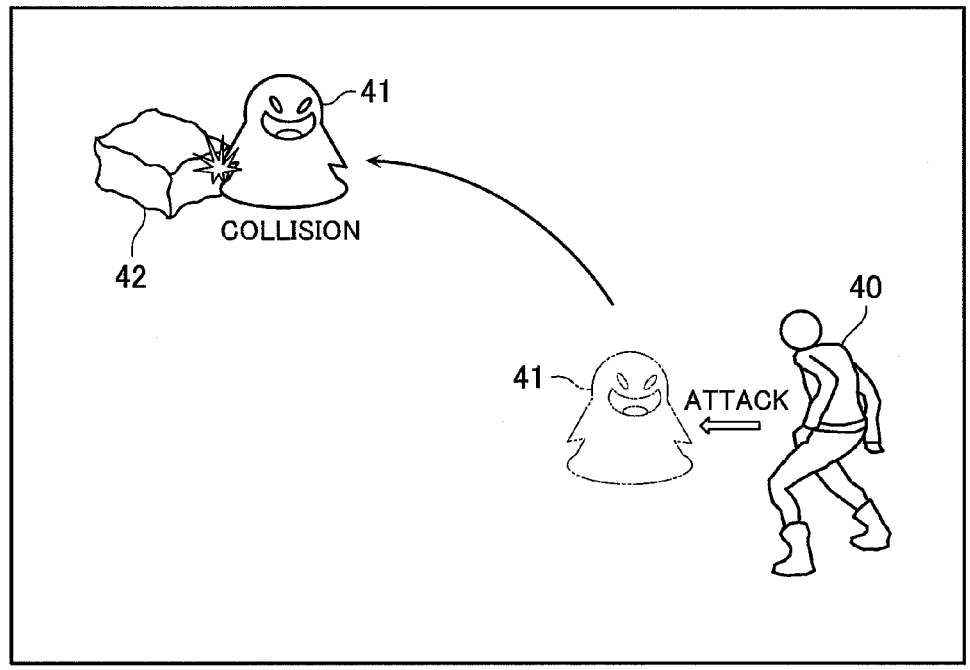
FIG. 6 is an explanatory drawing that shows an example of the indirect attack that the player character applies to the enemy character that is an attack target character.

FIGS. 4 to 6 are explanatory drawings that show some examples of the indirect attack that the player character applies to the enemy character that is an attack target character. As shown in FIG. 4, the indirect attack may be an attack in which a player character 40 causes an object item 42 such as a stone to be moved by directly attacking the object item 42, and the object item 42 is caused to collide with an enemy character 41, whereby a damage is applied to the enemy character 41.

Further, as shown in FIG. 5, the indirect attack may be an attack in which the player character 40 causes the object item 42 to be moved by directly attacking the object item 42, the object item 42 is caused to collide with other object item 43 such as a wall, and a damage is influenced on the enemy character 41 by means of a shock wave generated by the collision.

Moreover, as shown in FIG. 6, the indirect attack may be an attack in which the player character 40 causes the enemy character 41 to be moved by directly attacking the enemy character 41, and the enemy character 41 is caused to collide with the object item 42, whereby a damage is applied to the enemy character 41. In the case where the enemy character 41 is attacked by the player character 40 with such an indirect attack, a panic reaction is immediately started as described above. In this regard, since the indirect attack is a part of the specific kinds of attacks, the panic reaction is started at the start timing shown in FIG. 3 by means of a special attack. Here, the panic reaction will now be described.

Figure 7:
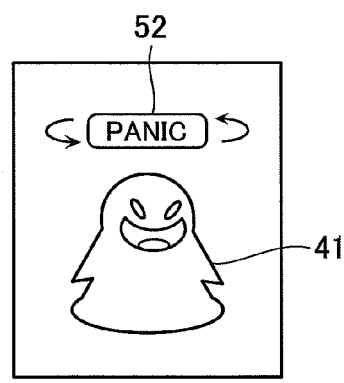
FIG. 7 is an explanatory drawing that shows an example of a reaction of the enemy character such as a panic reaction.

FIG. 7 is an explanatory drawing that shows an example of a reaction of the enemy character such as a panic reaction. As shown in FIG. 7, in the case where the enemy character 41 suffers the specific kind of attack from the player character 40 (not shown in FIG. 7) and a panic reaction is started for the enemy character 41, the status of the enemy character 41 is displayed as follows, for example. Namely, when the panic reaction is started, an icon 52 is displayed in the vicinity of the display position of the enemy character 41 (in this case, an overhead position of the enemy character 41) on the image display screen 51 while rotating, for example. The icon 52 indicates that the panic reaction is being executed.

The icon 52 is displayed so that the display color thereof is changed in response to a difference of the panic level described above. In this case, the icon 52 may be displayed so that the display form thereof (for example, size or shape of the display) is changed in response to the difference of the panic level in place of or in addition to the display color. By displaying the state of the panic reaction in this manner, the player operating the player character 40 is allowed to easily view and recognize that the enemy character 41 becomes a panic reaction state. Further, the display of the status of the enemy character 41 which indicates that the panic reaction is being executed is not limited to the icon 52 described above. The status of the enemy character 41 may be made so that a numeral representing a panic reaction term is displayed at the overhead position of the enemy character 41, or so that the display color or the display form of the enemy character 41 is changed.

In the video game apparatus 100 of the present embodiment, in the case where the enemy character 41 suffers a direct attack from the player character 40 during execution of such a panic reaction, a privilege is applied to the player character 40. More specifically, a privilege is applied to the player character 40 in accordance with a remaining term of the panic reaction term, for example. Further, the privilege is specifically an item or the like utilized to have an influence on a status or ability of at least one of the player character 40 and the enemy character 41, for example.

Figure 8:
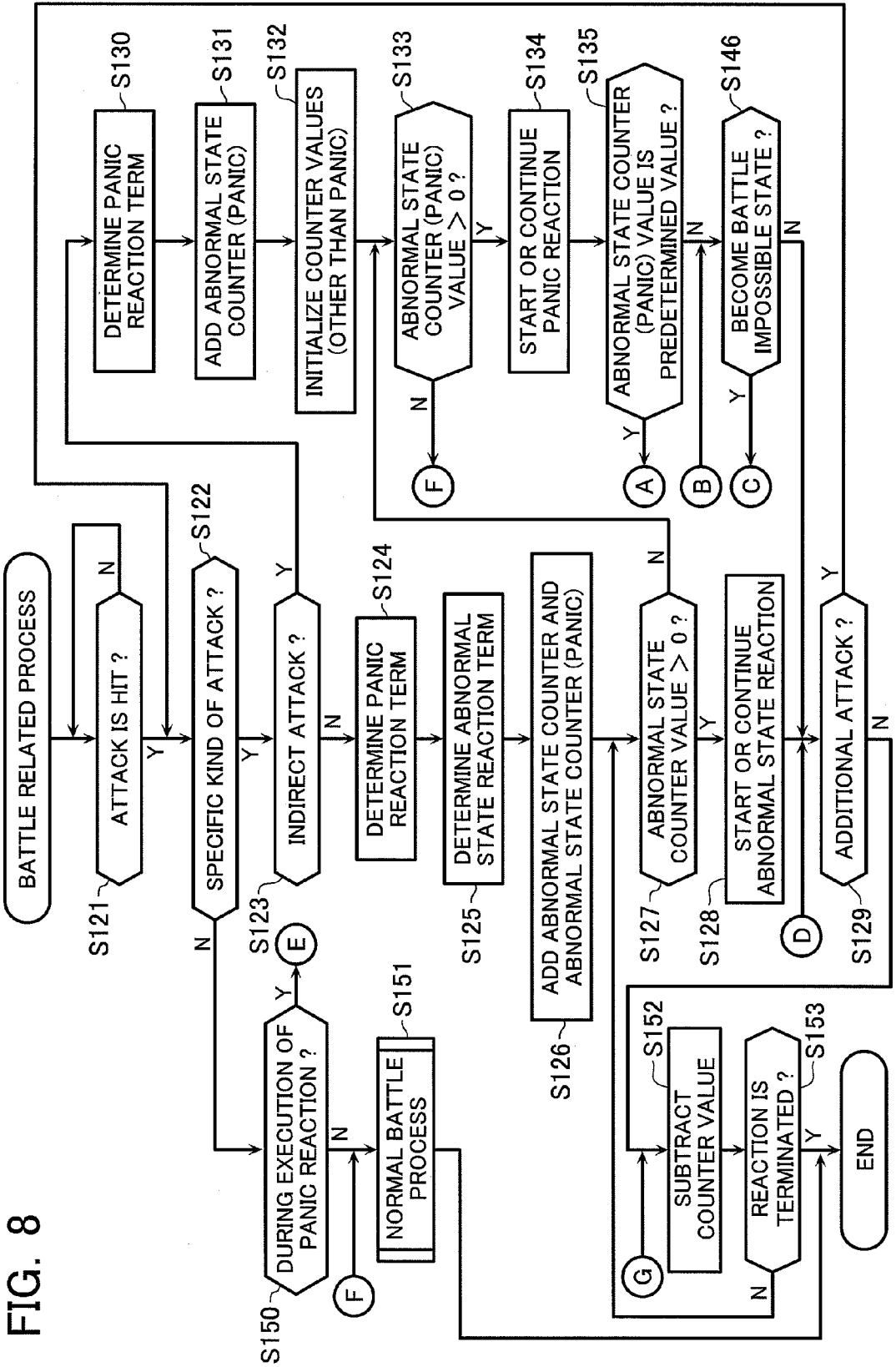
FIG. 8 is a flowchart that illustrates an example of a battle related process.
Figure 9:
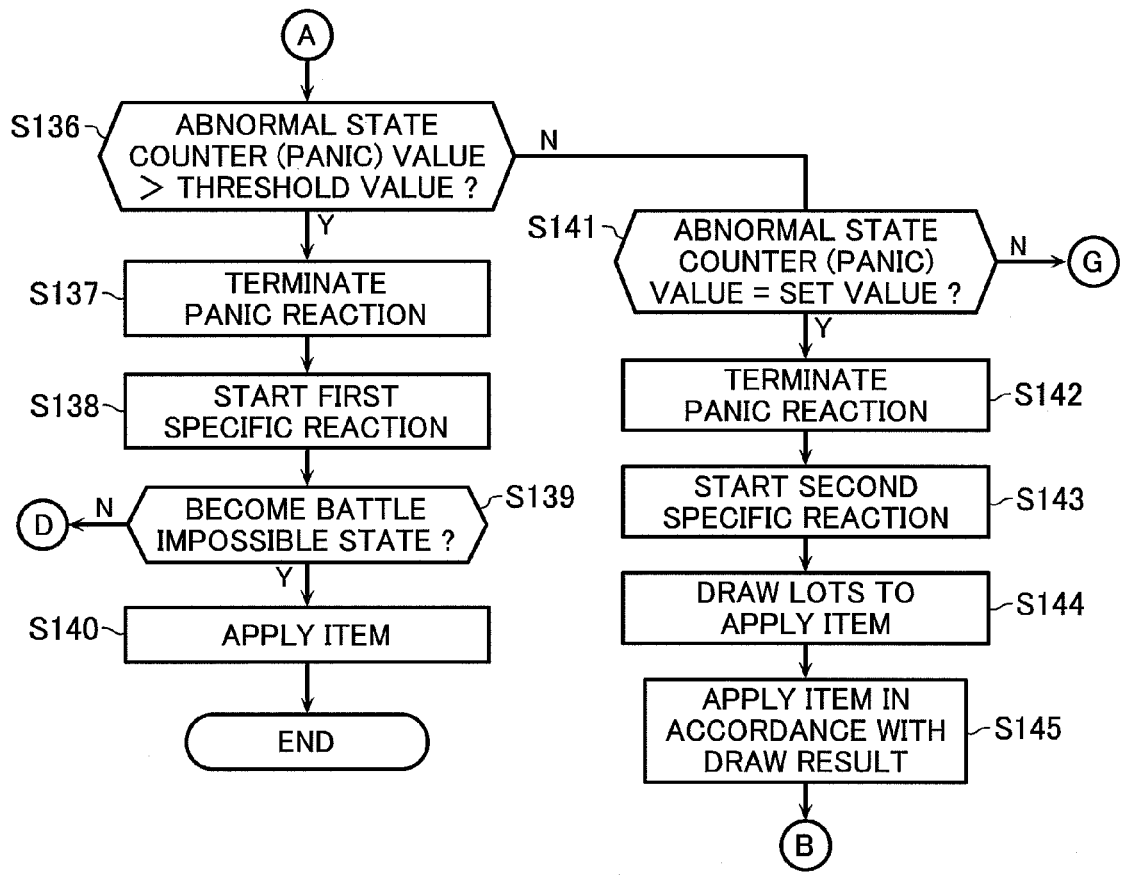
FIG. 9 is a flowchart that illustrates an example of a battle related process.
Figure 10:
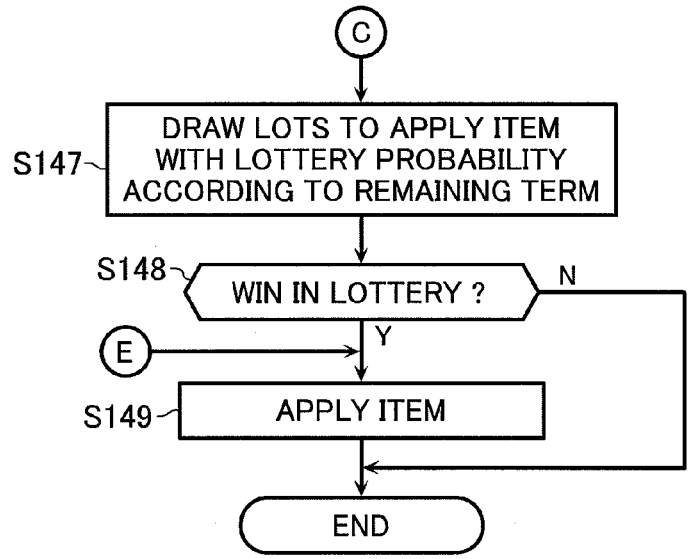
FIG. 10 is a flowchart that illustrates an example of a battle related process.

Next, a battle related process including application of a privilege in the video game apparatus 100 according to the present embodiment will now be described. In this regard, the battle related process is a process executed by repeatedly executing Steps S108 to S110 in the flowchart shown in FIG. 2. FIGS. 8 to 10 are a series of flowchart that illustrates an example of the battle related process in the video game apparatus 100 of the present embodiment. Here, the case where a player character 40 attacks an enemy character 41 and the enemy character 41 that suffers the attack thereby executes various reactions will be described as one example.

As shown in FIG. 8, in the battle related process, the control section 11 first determines whether or not an attack from the player character 40 hits the enemy character 41 to apply a damage to the enemy character 41 (Step S121). More specifically, when an attack is instructed on the basis of an operation of the keypad 30 by the player, the control section 11 determines whether or not the attack hits any of the enemy characters 41 positioned in the field in accordance with the kind of attack from the player character 40 (a direct attack by a weapon or the like with which the player character 40 is equipped, the specific kind of attack by usable magic, and the like) and a positional relationship between the player character 40 and the enemy character 41 positioned in the field. Namely, the control section 11 determines whether or not the attack hits the enemy character by determining whether or not the enemy character 41 is positioned within an attack effective area (attack effective range) defined in advance in accordance with the kind of attack.

In the case where it is determined that the attack hits the enemy character 41 ("Yes" at Step S121), the control section 11 determines whether the attack that hits the enemy character 41 is the specific kind of attack or not (Step S122). Namely, the control section 11 determines whether the attack that hits the enemy character 41 is any of the specific kinds of attacks shown in FIG. 3 or not.

In the case where it is determined that the hit attack is the specific kind of attack ("Yes" at Step S122), the control section 11 determines whether the specific kind of attack thus hit is an indirect attack or not (Step S123). Namely, the process to execute either a panic reaction or an abnormal state reaction by priority is different from each other on the basis of whether the specific kind of attack thus hit is the indirect attack or the special attack. Therefore, the control section 11 executes the determination process at Step S122.

In the case where it is determined that the specific kind of attack thus hit is not the indirect attack (this is, it is the special attack) ("No" at Step S123), the control section 11 determines a panic reaction term on the basis of the counter value of the abnormal state counter or the counter value for the enemy character 41 that suffers the special attack of the abnormal state counter (panic), and parameters such as the panic range and the panic trigger flag (Step S124). The enemy character 41 becomes a state where the enemy character 41 cannot attack the player character 40 and defend oneself from the player character 40 in the panic reaction term. The control section 11 also determines an abnormal state reaction term (Step S125). Each of the panic reaction term and the abnormal state reaction term may be determined in accordance with time such as 30 seconds or 15 seconds on the basis of the respective parameters, or in accordance with a permissible amount of each of strength of attack and times that the enemy character 41 suffers during these reaction terms.

When the panic reaction term and the abnormal state reaction term are determined, the control section 11 adds the counter value of the abnormal state counter and the counter value of the abnormal state counter (panic) on the basis of the kind of special attack that the enemy character 41 suffers, for example (Step S126). The control section 11 then determines whether or not the counter value of the abnormal state counter is more than 0 (Step S127). In the case where it is determined that the counter value is more than 0 ("Yes" at Step S127), a abnormal state reaction is started if the abnormal state reaction is not started and the abnormal state reaction is continued if the abnormal reaction has already been started (Step S128).

On the other hand, in the case where it is determined that the counter value of the abnormal state counter is 0 ("No" at Step S127), the processing flow shifts to Step S133, and the control section 11 determines whether or not the counter value of the abnormal state counter (panic) is more than 0 (Step S133). Namely, in the case where it is determined that the counter value of the abnormal state counter is 0, the control section 11 determines whether or not the panic reaction is to be started or continued on the basis of the counter value of the abnormal state counter without starting or continuing the abnormal state reaction.

When the abnormal state reaction is started or continued, the control section 11 determines whether or not the enemy character 41 suffers an additional attack from the player character 40 (Step S129). In the process at Step S129, the control section 11 determines whether or not the enemy character 41 suffers the additional attack from the player character 40 after the attack that is a trigger to start or continue the abnormal state reaction or the panic reaction.

In the case where it is determined that the enemy character 41 suffers the additional attack from the player character 40 ("Yes" at Step S129), the processing flow shifts to Step S122 and the processes after Step S122 are repeatedly executed. In the case where it is determined that the enemy character 41 does not suffer the additional attack ("No" at Step S129), the control section 11 subtracts the respective counter values of the added abnormal state counter and the abnormal state counter (panic) (Step S152). The control section 11 then determines whether or not the abnormal state reaction or the panic reaction is terminated by determining whether or not the corresponding counter value becomes 0 (Step S153).

In this regard, in the process to subtract the counter value at Step S152 described above, a predetermined value may be subtracted from the corresponding counter value, for example, in the case where the enemy character 41 suffers a direct attack from the player character 40. Thus, in the case where the enemy character 41 sequentially suffers the direct attack from the player character 40, for example, the player is allowed to easily cause the corresponding counter value to be 0 earlier than the normal state. As a result, a chance to execute a special attack for adding the corresponding counter value can be newly applied to the player, and this makes it possible to increase variation of the attack.

In the case where it is determined that the corresponding reaction is not to be terminated ("No" at Step S153), the processing flow shifts to Step S127 described above, and the processes after Step S127 are repeatedly executed. In the case where it is determined that the corresponding reaction is to be terminated ("Yes" at Step S153), the control section 11 terminates the series of battle related process in this flowchart.

On the other hand, in the case where it is determined at Step S123 that the specific kind of attack thus hit is the indirect attack ("Yes" at Step S123), the control section 11 determines a panic reaction term on the basis of the counter value of the abnormal state counter or the counter value of the abnormal state counter (panic) for the enemy character 41 that suffers the attack, and parameters such as the panic range and the panic trigger flag (Step S130). The enemy character 41 becomes a state where the enemy character 41 cannot attack the player character 40 and defend oneself from the player character 40 in the panic reaction term.

The panic reaction term may be determined in accordance with time such as 30 seconds or 15 seconds on the basis of the respective parameters, or in accordance with a permissible amount of each of strength of attack and times that the enemy character 41 suffers during the panic reaction term. In this regard, the panic reaction term determined at Step S124 or S130 as described above may be newly determined so as to extend the remaining term in the case where the panic reaction term has already been determined.

When the panic reaction term is determined, the control section 11 adds the counter value of the abnormal state counter (panic) on the basis of the kind of indirect attack that the enemy character 41 suffers, for example (Step S131). The control section 11 then initializes the counter value (other than panic) (Step S132). Namely, at Step S131, the control section 11 adds the value of the panic upward value described above to the counter value of the abnormal state counter (panic), and at Step S132, initializes the counter values other than panic so that the abnormal state reaction having higher priority than the panic reaction is not executed.

When the counter values other than panic are initialized, the control section 11 determines whether or not the counter value of the abnormal state counter (panic) is more than 0 (Step S133). In the case where it is determined that the counter value is more than 0 ("Yes" at Step S133), the control section 11 starts a panic reaction if the panic reaction is not started, and continues the panic reaction if the panic reaction has already been started (Step S134).

On the other hand, in the case where it is determined that the counter value of the abnormal state counter (panic) is 0 ("No" at Step S133), the processing flow shifts to Step S151 without starting the panic reaction. The control section 11 executes a normal battle process (for example, the battle process in which the player character 40 continues to attack the enemy character 41 until the enemy character 41 becomes a battle impossible state) (Step S151), and terminates the series of process in this flowchart.

When the panic reaction is started or continued, the control section 11 determines whether the counter value of the abnormal state counter (panic) added at Step S126 or S131 described above is a predetermined value or not (Step S135). In the case where it is determined that the counter value of the abnormal state counter (panic) is the predetermined value ("Yes" at Step S135), as shown in FIG. 9, the control section 11 determines whether or not the counter value of the abnormal state counter (panic) is more than a threshold value (Step S136). The threshold value is set to a value of 100, for example. In this case, at Step S136, the control section 11 determines whether or not the counter value of the abnormal state counter (panic) exceeds the value of 100.

In the case where it is determined that the counter value of the abnormal state counter (panic) is more than the threshold value ("Yes" at Step S136), the control section 11 terminates the executing panic reaction (Step S137), and starts a first specific reaction (Step S138). The control section 11 then executes the first specific reaction until the panic reaction term determined at Step S124 or S130 elapses. Here, the first specific reaction will now be described.

Figure 11:
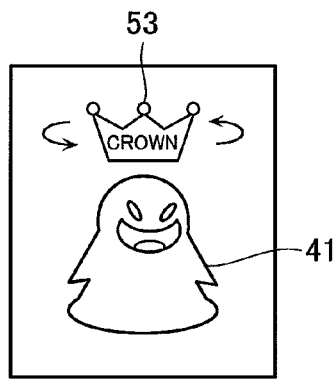
FIG. 11 is an explanatory drawing that shows an example of a reaction of the enemy character in a first specific reaction.

FIG. 11 is an explanatory drawing that shows an example of a reaction of the enemy character in the first specific reaction. As shown in FIG. 11, the first specific reaction is different from the panic reaction. The first specific reaction is a reaction in which the enemy character 41 becomes a state where the enemy character 41 cannot attack the player character 40 and defend oneself from the player character 40 while indicating that the counter value of the abnormal state counter (panic) exceeds the threshold value. In this case, as a privilege to be applied to the player character 40 by means of the first specific reaction, an icon 53 indicating an obtainable item (in this case, a crown) is displayed in the vicinity of the display position of the enemy character 41 (in this case, an overhead position of the enemy character 41) on the image display screen 51 while rotating, for example.

When the first specific reaction is started, the control section 11 determines whether or not the remaining hit point HP is lost by means of the attack and the enemy character 41 thereby becomes a battle impossible state (Step S139). In the case where it is determined that the enemy character 41 becomes the battle impossible state ("Yes" at Step S139) and the enemy character 41 becomes the battle impossible state by means of a direct attack, the control section 11 applies the item indicated by the icon 53 on the image display screen 51 to the player character 40 (Step S140). The processing flow is then terminated. Further, at Step S140, the control section 11 terminates the battle related process without applying the item to the player character 40 in the case where the enemy character 41 becomes the battle impossible state by means of the specific kind of attack. In the case where it is determined that the enemy character 41 does not become the battle impossible state ("No" at Step S139), the processing flow shifts to Step S129 described above, and the control section 11 executes an additional attack determining process at Step S129.

On the other hand, in the case where it is determined that the counter value of the abnormal state counter (panic) is not more than the threshold value ("No" at Step S136), the control section 11 determines whether or not the counter value of the abnormal state counter (panic) is a set value (Step S141). Here, the set value is a preset value such as a repdigit (55, 77, 99 or the like), for example.

In the case where it is determined that the counter value of the abnormal state counter (panic) is the set value ("Yes" at Step S141), the control section 11 terminates the executing panic reaction (Step S142), and starts the second specific reaction (Step S143). The control section 11 then executes the second specific reaction until the panic reaction term determined at Step S124 or S130 elapses.

The second specific reaction (here, illustration thereof is omitted) is different from the first specific reaction. The second reaction is a reaction in which in the case where the counter value of the abnormal state counter (panic) becomes the set value, lots relating to the privilege to be applied are drawn, the status representing the privilege determined by lottery is displayed like the icon 53 described above (that is, the privilege by lottery is displayed as the icon 53), and the enemy character 41 becomes a state where the enemy character 41 cannot attack the player character 40 and defend oneself from the player character 40.

When the second specific reaction is started, the control section 11 draws lots to apply an item, whose status is displayed, as the privilege to be applied (Step S144), and applies the item according to a drawn result to the player character 40 (Step S145). In this case, in the second specific reaction, any item may not be applied to the player character 40 in accordance with the drawn result.

In this regard, in the case where it is determined that the counter value of the abnormal state counter (panic) is not the set value ("No" at Step S141), the processing flow shifts to Step S152 described above, and the control section 11 executes the subtraction process for the respective counter values at Step S152.

When the item according to the drawn result is applied to the player character 40, as shown in FIG. 8, the control section 11 determines whether or not the remaining hit point HP or the like of the enemy character 41 has been lost by suffering the attack, for example, and the enemy character 41 is in a battle impossible state (Step S146). The process at Step S146 is also executed in the case where it is determined that the counter value of the abnormal state counter (panic) is not the predetermined value ("No" at Step S135).

In the case where it is determined that the enemy character 41 is in the battle impossible state ("Yes" at Step S146) and the enemy character 41 becomes the battle impossible state by means of a direct attack, as shown in FIG. 10, the control section 11 draws lots relating to application of an item as a privilege with a lottery probability according to the remaining term of the panic reaction term (Step S147). In the case where it is determined that the player wins in lottery ("Yes" at Step S148), the item is applied to the player character 40 (Step S149). The processing flow is then terminated. Further, at Step S147, the control section 11 terminates the battle related process without causing the player to draw lots relating to the application of the item in the case where the enemy character 41 becomes the battle impossible state by means of the specific kind of attack.

In the case where it is determined that the enemy character 41 does not become a battle impossible state ("No" at Step S146), the processing flow shifts to Step S129 described above, and the control section 11 executes an additional attack determining process at Step S129. In this regard, in the case where it is determined at Step S122 that the attack hitting the enemy character 41 is not the specific kind of attack ("No" at Step S122) after it is determined at Step S129 that the enemy character 41 suffers the additional attack from the player character 40 ("Yes" at Step S129), the control section 11 determines whether or not the enemy character 41 is executing the panic reaction (Step S150). In the case where it is determined that the enemy character 41 is executing the panic reaction ("Yes" at Step S150), the control section 11 applies the item to the player character 40 at Step S149 described above. In the case where it is determined that the enemy character 41 is not executing the panic reaction ("No" at Step S150), the processing flow shifts to Step S151, and the control section 11 executes the normal battle process. The control section 11 then terminates the series of battle related process in this flowchart. In this case, at Step S149 described above, the control section 11 may apply the item to the player character 40 in accordance with the remaining term of the panic reaction term, for example (that is, for example, by changing an item to be applied in the remaining term or otherwise).

In the case where the enemy character 41 suffers the special kind of attack from the player character 40 as described above, the reaction relating to application of the item as the privilege, such as the panic reaction, the first specific reaction and the second specific reaction, is executed. Thus, it is possible to increase variation of the attack by allowing a strategic attack during a battle, and this makes it possible to improve interest of the player in playing of the video game. Next, a different between start timing of the abnormal state reaction and the panic reaction described above will be described.

Figure 12:
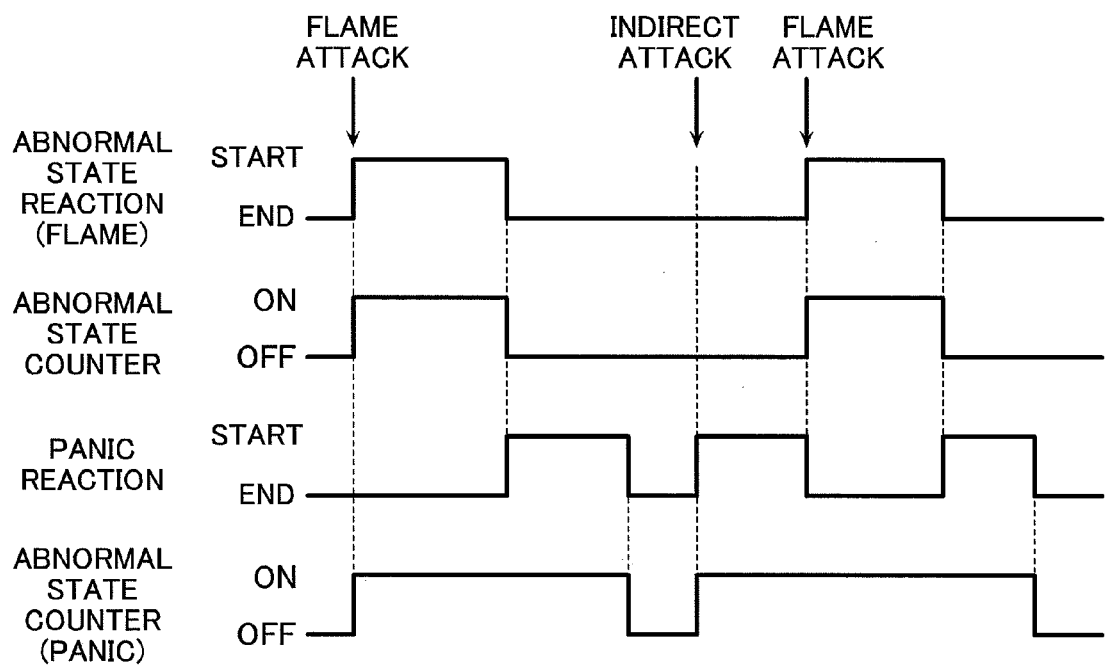
FIG. 12 is a timing chart that shows start timing of each of the abnormal state reaction and the panic reaction.

FIG. 12 is a timing chart that shows start timing of each of the abnormal state reaction and the panic reaction. Here, a flame attack is mentioned as an example of the special attack inducing the abnormal state reaction, and the explanation will be made. As described above, since the abnormal state reaction is executed in priority to the panic reaction, the start timing thereof is as follows. As shown in FIG. 12, in the case where the enemy character 41 suffers a flame attack from the player character 40, the abnormal state reaction of the flame attack is started. In addition, the abnormal state counter and the abnormal state counter (panic) are turned on, and the counter values are respectively added thereto.

The abnormal state reaction of the flame attack is continuously executed until the counter value of the abnormal state counter becomes 0. When the counter value becomes 0 and the abnormal state counter is turned off, the abnormal state reaction of the flame attack is terminated. In this case, in the case where the counter value of the abnormal state counter (panic) remains, the panic reaction is started at the same time when the abnormal state reaction of the flame attack is terminated.

The panic reaction is continuously executed until the counter value of the abnormal state counter (panic) becomes 0. When the counter value becomes 0 and the abnormal state counter (panic) is turned off, the panic reaction is terminated. Then, in the case where the enemy character 41 suffers an indirect attack from the player character 40, the panic reaction is started. In addition, the abnormal state counter (panic) is turned on, and the counter value is added thereto.

In the case where the enemy character 41 then suffers the flame attack from the player character 40 again, the abnormal state reaction of the flame attack is started, and the panic reaction is terminated. The abnormal state counter is turned on, and the on state of the abnormal state counter (panic) is continued. The respective counter values are then added thereto.

The abnormal state reaction of the flame attack is continuously executed until the counter value of the abnormal state counter becomes 0 as described above. When the counter value becomes 0 and the abnormal state counter is turned off, the abnormal state reaction of the flame attack is terminated. In this case, similarly, in the case where the counter value of the abnormal state counter (panic) remains, the panic reaction is started at the same time when the abnormal state reaction of the flame attack is terminated. The panic reaction is continuously executed until the counter value of the abnormal state counter (panic) becomes 0. When the counter value becomes 0 and the abnormal state counter (panic) is turned off, the panic reaction is terminated.

As explained above, in the embodiment described above, the video game apparatus 100 (video game processing apparatus) is constructed as follows. Namely, specification of an attack for the player character 40 is received by means of an attack specification operation of the player; when the player character 40 applies a damage to an enemy character 41 on the basis of an attack action of the player character 40 in accordance with the received attack specification (see Step S121), it is determined whether the attack suffered by the enemy character 41 is a direct attack or a specific kind of attack (see Step S122), in the direct attack the enemy character 41 suffering a damage directly from the player character 40, the specific kind of attack being different from the direct attack and defined in advance; a panic reaction term of a panic reaction is determined in the case where it is determined that the attack is the specific kind of attack (see Steps S124 and S130), the panic reaction being a specific kind attack suffered reaction indicating a reaction of the enemy character 41 that suffers the specific kind of attack, in the panic reaction the enemy character 41 becoming a state where the enemy character 41 cannot attack the player character 40 and defend oneself from an attack from the player character 40; the panic reaction is executed for the enemy character 41 that suffers the specific kind of attack until the determined panic reaction term elapses (see Step S134); and a privilege is applied to the player character 40 (see Steps S140 and S149) when the enemy character 41 suffers the direct attack during execution of the panic reaction (see Steps S139 and S146). Thus, it is possible to increase variation of an attack by allowing a strategic attack (for example, an attack to obtain a privilege) during a battle in the video game, and this makes it possible to improve interest of a player in playing the video game.

Namely, not only the player character 40 merely attacks the enemy character 41, but also the player character 40 can obtain the privilege by attacking the enemy character 41 by means of the specific kind of attack. Thus, it is possible to improve interest in the playing of the video game without making the attack monotonous.

For example, in order to obtain a desired item, the player character 40 causes the enemy character 41 to become the panic reaction by means of the specific kind of attack and then applies a direct attack before the enemy character 41 becomes a battle impossible state by means of the direct attack, whereby the player character 40 can obtain the item. Thus, since the player can devise various variations in the attack, it can be expected that motivation of skilled player to play the video game is maintained and improved.

Further, in the embodiment described above, the video game apparatus 100 is constructed so that the image display apparatus is caused to display a status about the degree of the panic reaction in the vicinity of a display position of the enemy character 41 on the image display screen while the panic reaction is executed for the enemy character 41. Thus, the player is allowed to easily view the degree of the panic reaction of the enemy character 41, and this makes it possible to increase variation of the attack by causing the player to consider a strategic attack.

Moreover, in the embodiment described above, the video game apparatus 100 is constructed so that a new panic reaction term is determined by extending a remaining term of the previous panic reaction term (see Steps S124 and S130) in the case where it is determined that an additional attack that the enemy character 41 suffers during execution of the panic reaction is the specific kind of attack (see Steps S129 and S122). Thus, it is possible to arbitrarily extend the panic reaction term for the enemy character 41 due to an additional attack, and this makes it possible to increase variation of the attack by causing the player to consider a strategic attack.

Furthermore, in the embodiment described above, the video game apparatus 100 is constructed so that the specific kind of attack includes an indirect attack in which the player character 40 applied an attack to the enemy character 41 through an object item 42. Thus, it is possible to execute the panic reaction for the enemy character 41 by executing an indirect attack using an object item 42, and this makes it possible to increase variation of the attack by causing the player to consider a strategic attack.

Further, in the embodiment described above, the video game apparatus 100 is constructed so that: the specific kind of attack includes a specific attack in which the player character 40 applies an attack inducing an abnormal state such as a flame, freezing, a paralysis, darkness, confusion, fainting, petrifaction or poison to the enemy character 41; an abnormal state reaction term of an abnormal state reaction is determined (see Step S125) in the case where it is determined that the attack is the special attack (see Step S122), the abnormal state reaction being a specific kind attack suffered reaction indicating a reaction of the enemy character 41 that suffers the special attack in which the enemy character 41 becomes an abnormal state in accordance with the kind of the special attack; the abnormal state reaction is executed for the enemy character 41, which suffers the special attack, until the determined abnormal state reaction term elapses without executing the panic reaction (see Step S128); and the panic reaction is executed for the enemy character 41 until the panic reaction term elapses in the case where the panic reaction term does not elapse when the abnormal state reaction term has elapsed (see FIG. 12). Thus, it is possible to execute the abnormal state reaction for the enemy character 41 in priority to the panic reaction by executing the special attack inducing an abnormal state, and this makes it possible to increase variation of the attack by causing the player to consider a strategic attack.

Moreover, in the embodiment described above, the video game apparatus 100 is constructed so that: in the case where the new panic reaction term thus determined exceeds a predetermined threshold value during the execution of the panic reaction (see Step S136), the execution of the panic reaction for the enemy character 41 is terminated (see Step S137) and the image display apparatus is caused to display a status indicating that the new panic reaction term exceeds the predetermined threshold value in the vicinity of a display position of the enemy character 41 on the image display screen (see FIG. 11), and a first specific reaction, in which the enemy character 41 becomes a state where the enemy player 41 can attack the player character 40 and defend oneself from the player character 40, is executed until the new panic reaction term elapses (see Step S138); and a privilege according to the display status of the enemy character 41 is applied to the player character 40 (see Step S140) in the case where the enemy character 41 suffers the direct attack from the player character 40 to become a battle impossible state during execution of the first specific reaction (see Step S139). Thus, the player character 40 is also allowed to obtain a privilege during the execution of the first specific reaction different from the panic reaction, and this makes it possible to increase variation of the attack by causing the player to consider a strategic attack.

Furthermore, in the embodiment described above, the video game apparatus 100 is constructed so that: in the case where the new panic reaction term thus determined becomes a predetermined set value during the execution of the panic reaction (see Step S141), the execution of the panic reaction for the enemy character 41 is terminated (see Step S142) and the image display apparatus is caused to display a status by lottery on the basis of the predetermined set value in the vicinity of a display position of the enemy character 41 on the image display screen; and a second specific reaction, in which the enemy character 41 becomes a state where the enemy player 41 can attack the player character 40 and defend oneself from the player character 40, is executed until the new panic reaction term elapses (see Step S143); and a privilege according to the display status of the enemy character 41 is applied to the player character 40 on the basis of a predetermined condition during execution of the second specific reaction (see Steps S144 and S145). Thus, the player character 40 is also allowed to obtain a privilege during the execution of the second specific reaction different from the panic reaction, and this makes it possible to increase variation of the attack by causing the player to consider a strategic attack.

Further, in the embodiment described above, the video game apparatus 100 is constructed so that a privilege applied to the player character 40 in accordance with a remaining term of the panic reaction term (see Step S149) in the case where it is determined that the enemy character 41 suffers the direct attack from the player character 40 during the execution of the panic reaction (see Step S150). Thus, the player character 40 is allowed to obtain a privilege by executing a direct attack against the enemy character 41 during the execution of the panic reaction even when the panic reaction term does not elapse, and this makes it possible to increase variation of the attack by causing the player to consider a strategic attack.

Moreover, in the embodiment described above, the video game apparatus 100 is constructed so that: in the case where the enemy character 41 suffers the direct attack from the player character 40 to become a battle impossible state during the execution of the panic reaction (see Step S146), lots relating to application of the privilege are drawn with a lottery probability according to a remaining term of the panic reaction term (see Step S147); and the privilege is applied to the player character 40 on the basis of a draw result (see Steps S148 and S149). Namely, a probability to obtain the privilege is changed in accordance with the remaining term of the panic reaction term (specifically, the counter value (count number) of the abnormal state counter). Thus, the player character 40 is allowed to obtain a privilege with a high probability by considering timing to cause the enemy character 41 to become a battle impossible state by means of a direct attack during the execution of the panic reaction, and this makes it possible to increase variation of the attack by causing the player to consider a strategic attack.

Furthermore, in the embodiment described above, the video game apparatus 100 is constructed so that the privilege is an item utilized to have an influence on a status or ability of at least one of the player character 40 and the enemy character 41. Thus, it is possible to increase variation of the attack tended to obtain an item using the panic reaction and the like.

Further, although the video game apparatus main body 10 and the display device 50 are constructed from separate components in the embodiment described above, the display device 50 may be incorporated in the video game apparatus main body 10, as will be readily apparent to those skilled in the art, without departing from the scope of spirit of the present invention.

Moreover, although one example of the video game control for the RPG has been explained in the embodiment described above, there is no wonder that the technique of the present invention can be applied to similar video games such as a gun action RPG. In addition, the technique of the present invention can also be applied to other kinds of video games appropriately, as will be readily apparent to those skilled in the art, without departing from the scope of spirit of the present invention.

Furthermore, although an aspect of the present invention has been described with the video game apparatus 100 as an example in the embodiment described above, the present invention is not limited thereto. The present invention can be applied to various apparatuses such as a personal computer, a cellular phone terminal, a portable game apparatus and the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the present invention.

Further, in the embodiment described above, it has been described that game data for causing the video game apparatus main body 10 (video game apparatus 100) to execute the various processes described above (that is, various data such as control program data used for the video game) are stored in the storage medium 70. However, the present invention is not limited thereto. The video game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the video game data delivered by the server apparatus via the communication network 80, and store the video game data in the HDD 13. The video game data may be used by being loaded on the RAM 12 from the HDD 13. In this regard, although the video game data are explained in the embodiment described above, such data may include at least control program data for causing a computer to execute the image generating process in the embodiment as described above.

The present invention can be applied to a video game machine, a personal computer, a cellular phone terminal, a portable game apparatus or the like, or any combination thereof that causes an image display apparatus to display a player character on an image display screen, and controls progress of a video game by controlling an action of the player character displayed on the image display screen in response to an operation by a player. Therefore, the present invention is useful.

What is claimed is:

1. A video game processing apparatus that causes an image display apparatus to display a player character on an image display screen of the image display apparatus, the video game processing apparatus controlling progress of a video game by controlling an action of the player character to be displayed on the image display screen in accordance with operations by a player, the video game processing apparatus comprising:

an attack specification receiver that receives an attack specification for the player character by an attack specification operation of the player;

an attack determiner that, when the player character applies a damage to an attack target character on the basis of an attack action of the player character in accordance with the attack specification received by the attack specification receiver, determines whether the attack action suffered by the attack target character is one of a direct attack and a specific kind of attack, in the direct attack the attack target character suffering a damage directly from the player character, the specific kind of attack being different from the direct attack and defined in advance;

a reaction term determiner that determines a panic reaction term of a panic reaction when the attack determiner determines that the attack action is the specific kind of attack, the panic reaction being a specific kind of attack suffered reaction indicating a reaction of the attack target character that suffers the specific kind of attack, in the panic reaction the attack target character being in a state where the attack target character cannot attack the player character and defend oneself from an attack from the player character;

a reaction executor that executes the panic reaction for the attack target character that suffers the specific kind of attack until the panic reaction term determined by the reaction term determiner elapses; and a privilege applier that applies a privilege to the player character when the attack determiner determines that the attack target character suffers the direct attack during execution of the panic reaction by the reaction executor, wherein the reaction term determiner determines a new panic reaction term by extending a remaining term of a previous panic reaction term when the attack determiner determines that an additional attack that the attack target character suffers during execution of the previous panic reaction is the specific kind of attack, wherein, when the new panic reaction term determined by the reaction term determiner exceeds a predetermined threshold value during the execution of the previous panic reaction, the reaction executor terminates the execution of the panic reaction for the attack target character and causes the image display apparatus to display a status indicating that the new panic reaction term exceeds the predetermined threshold value in the vicinity of a display position of the attack target character on the image display screen, and executes a first specific reaction, in which the attack target character is in a state where the attack target player can attack the player character and defend oneself from the player character, until the new panic reaction term elapses, and wherein the privilege applier applies the privilege according to the displayed status of the attack target character to the player character when the attack target character suffers the direct attack from the player character to become a battle impossible state during execution of the first specific reaction.

2. The video game processing apparatus according to claim 1, wherein the reaction executor causes the image display apparatus to display a status about a degree of the panic reaction in the vicinity of the display position of the attack target character on the image display screen while the panic reaction is executed for the attack target character.

3. The video game processing apparatus according to claim 1, wherein the specific kind of attack includes an indirect attack in which the player character applied an attack to the attack target character through an object item, the object item being an item to which a neutral roll against the player character and the attack target character is applied.

4. The video game processing apparatus according to claim 1, further comprising:

an abnormal state reaction term determiner that determines an abnormal state reaction term of an abnormal state reaction when the attack determiner determines that the attack action is a special attack, the abnormal state reaction being a specific kind of attack suffered reaction indicating a reaction of the attack target character that suffers the special attack in which the attack target character is in an abnormal state in accordance with the kind of the special attack, the specific attack in which the player character applies an attack inducing an abnormal state to the attack target character being included in the specific kind of attack, wherein the reaction executor executes the abnormal state reaction for the attack target character, which suffers the special attack, until the abnormal state reaction term determined by the abnormal state reaction term determiner elapses without executing the panic reaction, and executes the panic reaction for the attack target character until the panic reaction term elapses when the panic reaction term does not elapse when the abnormal state reaction term has elapsed.

5. The video game processing apparatus according to claim 1, wherein, when the new panic reaction term determined by the reaction term determiner becomes a predetermined set value during the execution of the panic reaction, the reaction executor terminates the execution of the panic reaction for the attack target character and causes the image display apparatus to display a status by lottery on the basis of the predetermined set value in the vicinity of the display position of the attack target character on the image display screen, and executes a second specific reaction, in which the attack target character enters a state where the attack target player can attack the player character and defend oneself from the player character, until the new panic reaction term elapses, and wherein the privilege applier applies the privilege according to the display status of the attack target character to the player character on the basis of a predetermined condition during execution of the second specific reaction.

6. The video game processing apparatus according to claim 1, wherein the privilege applier applies the privilege to the player character in accordance with a remaining term of the panic reaction term when the attack determiner determines that the attack target character suffers the direct attack from the player character during the execution of the panic reaction.

7. The video game processing apparatus according to claim 1, wherein, when the attack target character suffers the direct attack from the player character to be in a battle impossible state during the execution of the panic reaction, the privilege applier draws lots relating to application of the privilege with a lottery probability according to a remaining term of the panic reaction term, and applies the privilege to the player character on the basis of a drawn result.

8. The video game processing apparatus according to claim 1, wherein the privilege is an item to be utilized to have an influence on one of a status and an ability of at least one of the player character and the attack target character.

9. A storage medium encoded with a computer program product for processing a video game, progress of the video game being controlled by causing an image display apparatus to display a player character of the video game on an image screen of the image display apparatus, and controlling an action of the player character displayed on the image screen in accordance with operations by a player, the computer program product causing a computer to execute:

receiving an attack specification for the player character by an attack specification operation of the player;

when the player character applies a damage to an attack target character on the basis of an attack action of the player character in accordance with the attack specification received in the receiving an attack specification, determining whether the attack action suffered by the attack target character is one of a direct attack and a specific kind of attack, in the direct attack the attack target character suffering a damage directly from the player character, the specific kind of attack being different from the direct attack and defined in advance;

determining a panic reaction term of a panic reaction when it is determined that the attack action is the specific kind of attack in the determining whether the attack action is one of a direct attack and a specific kind of attack, the panic reaction being a specific kind of attack suffered reaction indicating a reaction of the attack target character that suffers the specific kind of attack, in the panic reaction the attack target character entering a state where the attack target character cannot attack the player character and defend oneself from an attack from the player character;

executing the panic reaction for the attack target character that suffers the specific kind of attack until the panic reaction term determined in the determining a panic reaction term elapses; and applying a privilege to the player character when it is determined that the attack target character suffers the direct attack during execution of the panic reaction in the executing the panic reaction, wherein a new panic reaction term is determined in the determining a panic reaction term by extending a remaining term of a previous panic reaction term when it is determined that an additional attack that the attack target character suffers during execution of the previous panic reaction is the specific kind of attack, wherein, when the new panic reaction term determined in the determining a panic reaction term exceeds a predetermined threshold value during the execution of the previous panic reaction, the execution of the panic reaction for the attack target character is terminated and the image display apparatus is caused to display a status indicating that the new panic reaction term exceeds the predetermined threshold value in the vicinity of a display position of the attack target character on the image display screen, and a first specific reaction, in which the attack target character enters a state where the attack target player can attack the player character and defend oneself from the player character, is executed until the new panic reaction term elapses, and wherein the privilege according to the displayed status of the attack target character is applied to the player character in the applying a privilege when the attack target character suffers the direct attack from the player character to be in a battle impossible state during execution of the first specific reaction.

10. The storage medium encoded with the computer program product according to claim 9, wherein the computer program product further causes a computer to execute:

determining an abnormal state reaction term of an abnormal state reaction when it is determined that the attack action is a special attack in the determining a panic reaction term, the abnormal state reaction being a specific kind of attack suffered reaction indicating a reaction of the attack target character that suffers the special attack in which the attack target character enters an abnormal state in accordance with the kind of the special attack, the specific attack in which the player character applies an attack inducing an abnormal state to the attack target character being included in the specific kind of attack, wherein the abnormal state reaction for the attack target character, which suffers the special attack, is executed in the executing the panic reaction until the abnormal state reaction term determined in the determining an abnormal state reaction term elapses without executing the panic reaction, and the panic reaction for the attack target character is executed until the panic reaction term elapses when the panic reaction term does not elapse when the abnormal state reaction term has elapsed.

* * * * *